US011327329B2

(12) United States Patent
Wada

(10) Patent No.: US 11,327,329 B2
(45) Date of Patent: May 10, 2022

(54) INFORMATION PROCESSING APPARATUS AND SURFACE ROUGHNESS ACQUISITION METHOD

(71) Applicant: Sony Interactive Entertainment Inc., Tokyo (JP)

(72) Inventor: Shinya Wada, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 34 days.

(21) Appl. No.: 16/771,936

(22) PCT Filed: Dec. 22, 2017

(86) PCT No.: PCT/JP2017/046106
§ 371 (c)(1),
(2) Date: Jun. 11, 2020

(87) PCT Pub. No.: WO2019/123625
PCT Pub. Date: Jun. 27, 2019

(65) Prior Publication Data
US 2020/0393689 A1 Dec. 17, 2020

(51) Int. Cl.
*G02B 27/28* (2006.01)
*G02B 27/00* (2006.01)
(Continued)

(52) U.S. Cl.
CPC ....... *G02B 27/286* (2013.01); *G02B 27/0068* (2013.01); *G06V 10/145* (2022.01); *G06V 10/147* (2022.01); *G06V 10/60* (2022.01)

(58) Field of Classification Search
None
See application file for complete search history.

(56) References Cited

U.S. PATENT DOCUMENTS 8,648,902 B2   2/2014 Kanamori
10,366,303 B2  7/2019 Kondo
(Continued)

FOREIGN PATENT DOCUMENTS

| EP | 0999518 A1 | 5/2000 |
| JP | 2015115041 A | 6/2015 |
| WO | 2012011246 A1 | 1/2012 |

OTHER PUBLICATIONS

International Preliminary Report on Patentability and Written Opinion for corresponding PCT Application No. PCT/JP2017/046106, 11 pages dated Jul. 2, 2020.
(Continued)

*Primary Examiner* — Michelle M Iacoletti
*Assistant Examiner* — Danell L Owens
(74) *Attorney, Agent, or Firm* — Matthew B. Dernier, Esq.

(57) ABSTRACT

An information processing apparatus determines a plurality of sampling points in a range of a target object's silhouette having different specular reflectances in polarization images in a plurality of azimuths, extracts polarization luminance at the sampling points in question, and derives change in luminance relative to the polarization azimuth, thus acquiring, as a phase angle, the azimuth that provides the highest luminance. Then, the information processing apparatus evaluates a characteristic of the change in phase angle relative to the change in the specular reflectance, thus identifying a subject's surface roughness. Further, the information processing apparatus generates data to be output by performing a process according to the surface roughness and outputs the generated data.

13 Claims, 18 Drawing Sheets

(51) Int. Cl.
    *G06V 10/60*     (2022.01)
    *G06V 10/14*     (2022.01)
    *G06V 10/145*     (2022.01)
    *G06V 10/147*     (2022.01)

(56) References Cited

U.S. PATENT DOCUMENTS

| | | |
|---|---|---|
| 2006/0239584 A1 | 10/2006 | Motomura |
| 2009/0141027 A1* | 6/2009 | Sato ................ G06K 9/2036 345/426 |
| 2012/0206581 A1 | 8/2012 | Kanamori |
| 2016/0267348 A1 | 9/2016 | Kondo |

OTHER PUBLICATIONS

International Search Report for corresponding PCT Application No. PCT/JP2017/046106, 2 pages, dated Mar. 27, 2018.

* cited by examiner (a)　　　　　　　　　(b)　　　　　　　　　(c)

(a)                          (b)

(a) (b)

Es > Ep    Es = Ep    Es < Ep

FIG. 11
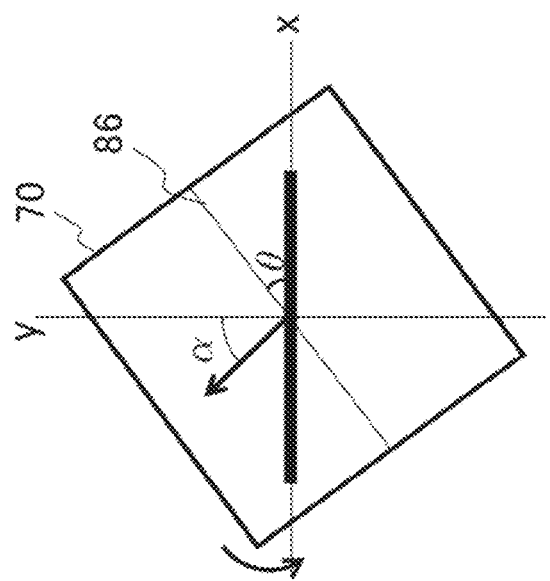
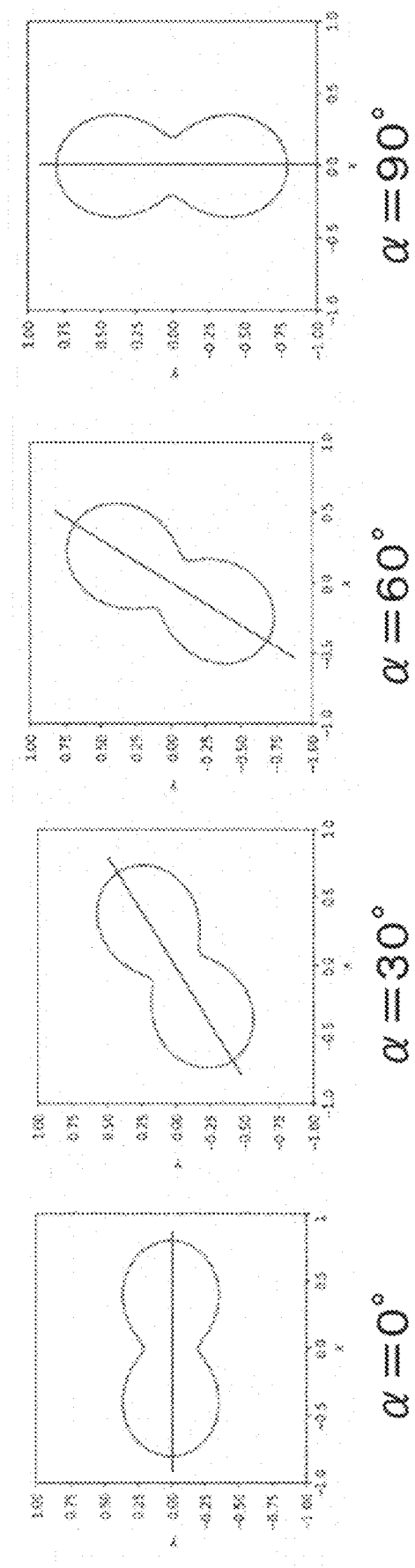

FIG.21
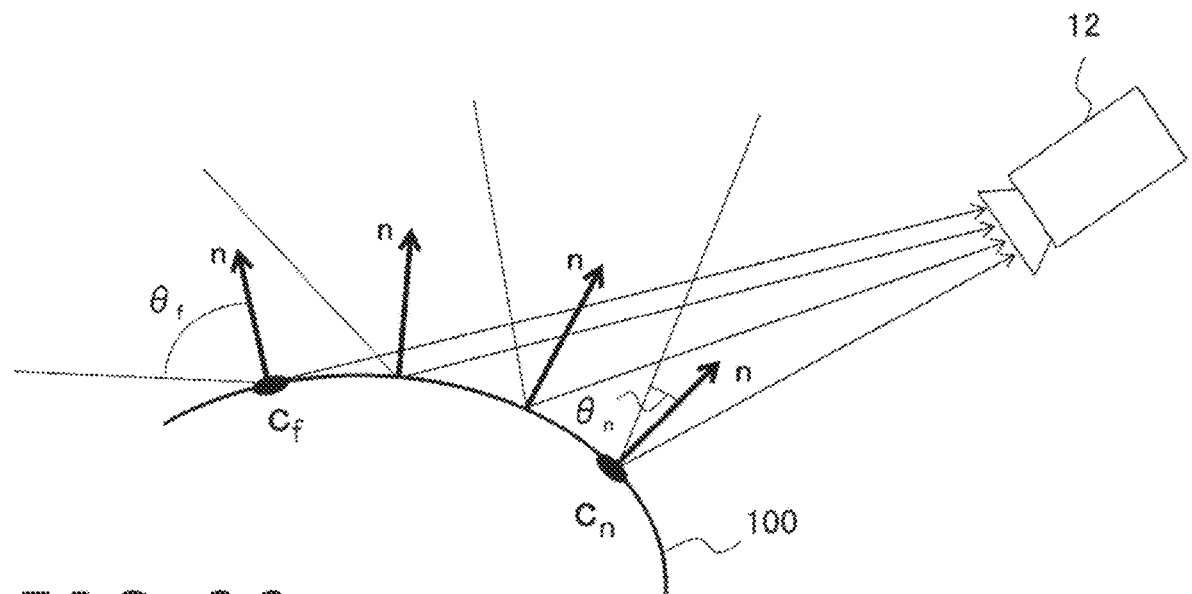
FIG.22
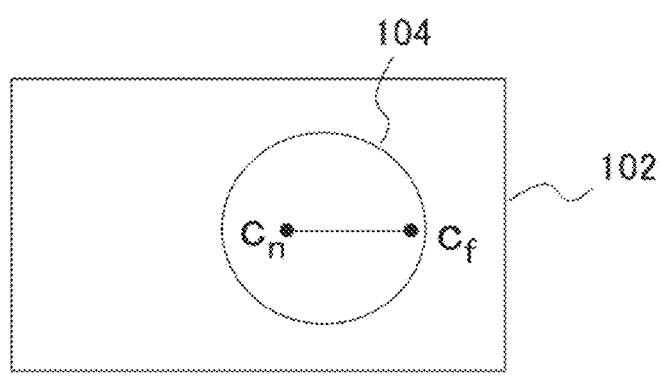
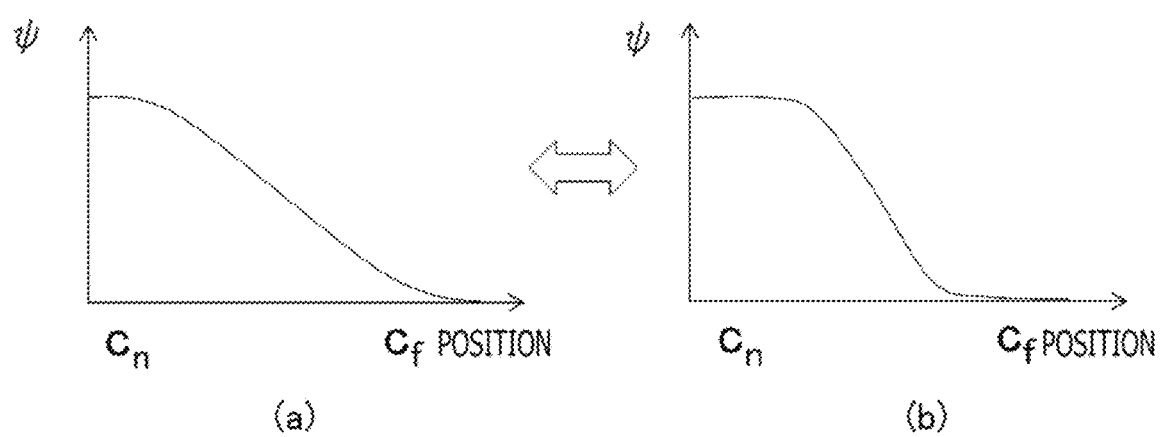
(a)  (b)

FIG. 23
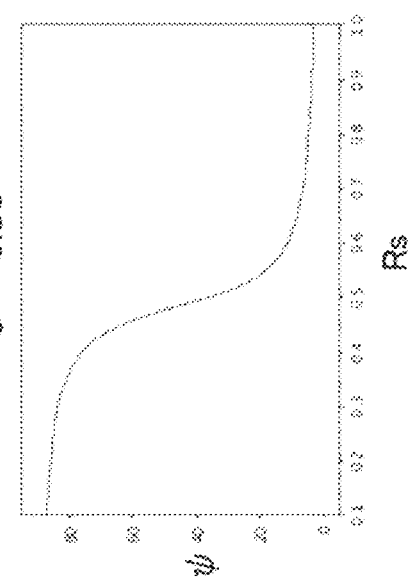
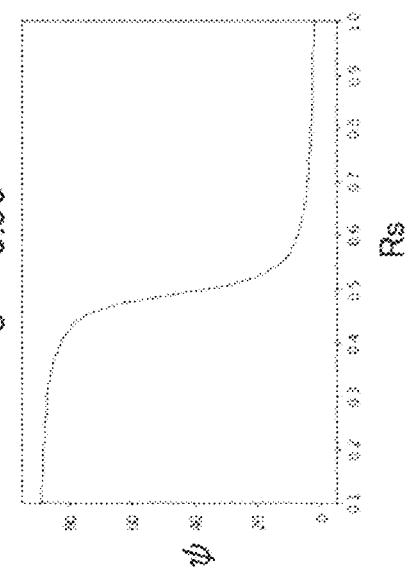
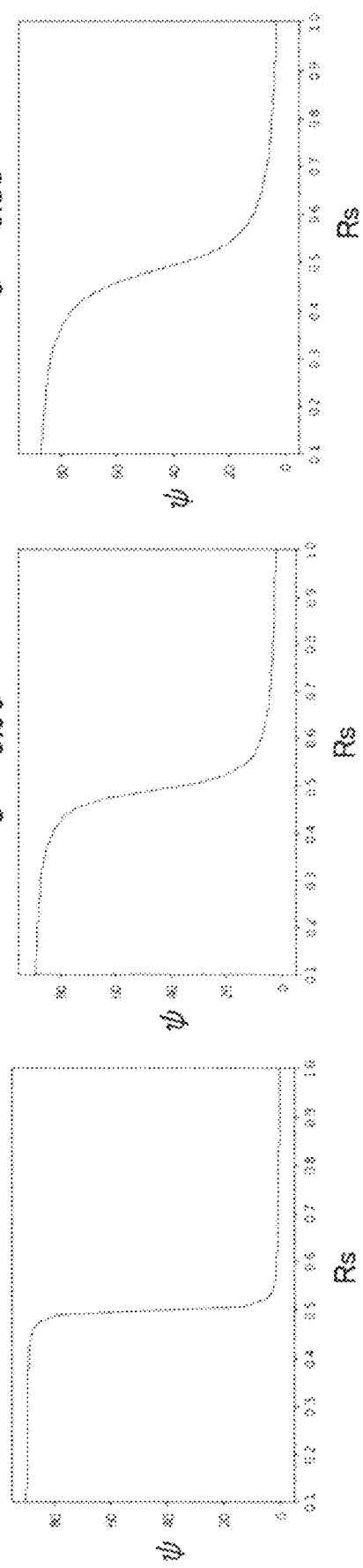
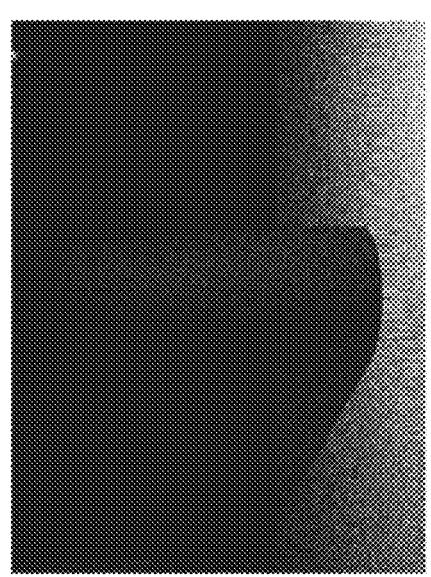
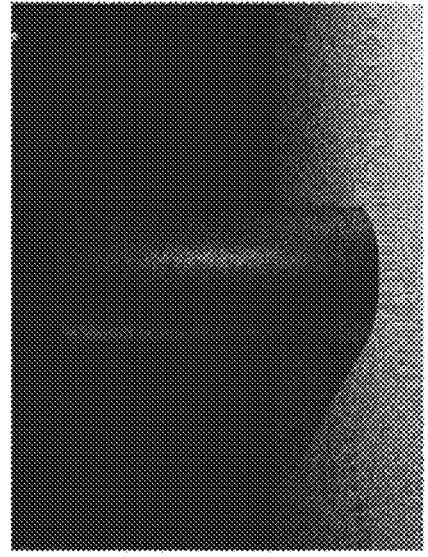
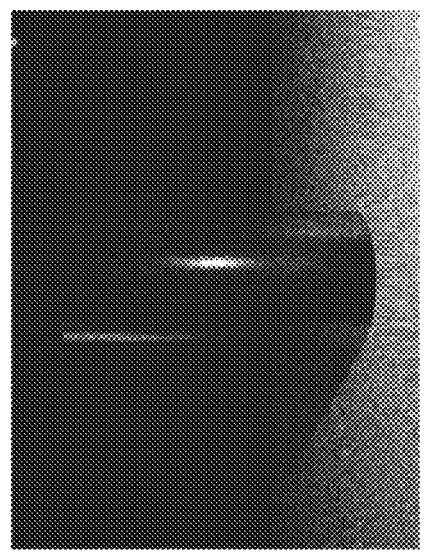

INFORMATION PROCESSING APPARATUS AND SURFACE ROUGHNESS ACQUISITION METHOD

TECHNICAL FIELD

The present invention relates to an information processing apparatus and a target object acquisition method for recognizing states of a target object and a subject space by using a captured image.

BACKGROUND ART

There are known games that use a display image obtained by capturing part of a user's body such as the head with a video camera, extracting a given region such as the eyes, the mouth, or the hands, and replacing the region with another image (refer, for example, to PTL 1). Also known is a user interface system that receives mouth or hand motion captured with a video camera as an application's operation instruction. As described above, techniques for capturing a real world and detecting a target object's state and performing information processing tasks on the basis thereof have been already applied to a wide range of fields including a monitoring camera, an autonomous driving system, an inspection apparatus in manufacturing line, and an automatically controlled robot in addition to electric content.

CITATION LIST

Patent Literature

[PTL 1] EP 0999518 A

SUMMARY

Technical Problems

A manner of a subject's silhouette in a captured image may change in accordance with a light condition such as surrounding brightness and presence or absence of an object. For example, even in the case of capturing the same subject, a color or luminance distribution of the silhouette thereof may change significantly, or it may be difficult to recognize a shape of the subject as a result that a clear contour of the subject cannot be obtained. There are cases in which, because of the same principle, it may be difficult to distinguish whether a silhouette of a certain target object represents an original color and shape which belong to the target object or the appearance thereof is accidentally obtained according to an amount of lighting. This may cause a target object to be erroneously recognized, resulting in deteriorated accuracy for subsequent information processing. Therefore, techniques are desired that permit more accurate recognition of the state of the target object by use of a captured image.

The present invention has been devised in light of the foregoing problems, and it is an object of the present invention to provide a technique for acquiring a state of a target object with high accuracy by use of a captured image.

Solution to Problems

A mode of the present invention relates to an information processing apparatus. This information processing apparatus includes an image acquisition section adapted to acquire data of polarization images in a plurality of azimuths, a phase angle acquisition section adapted to not only derive change in polarization luminance representing a subject's silhouette relative to the azimuth by using the polarization images but also acquire the azimuth that provides a maximum value of the polarization luminance as a phase angle, a surface roughness acquisition section adapted to acquire surface roughness of the subject by evaluating a characteristic of the phase angle with respect to change in the specular reflectance in accordance with a given reference, and an output data generation section adapted to generate data according to the surface roughness and output the generated data.

Another mode of the present invention is a surface roughness acquisition method. This surface roughness acquisition method includes a step of acquiring data of polarization images in a plurality of azimuths, a step of not only deriving change in polarization luminance representing a subject's silhouette relative to the azimuth by using the polarization images but also acquiring the azimuth that provides a maximum value of the polarization luminance as a phase angle, a step of acquiring surface roughness of the subject by evaluating a characteristic of the phase angle with respect to change in the specular reflectance in accordance with a given reference, and a step of generating data according to the surface roughness and outputting the generated data.

It should be noted that any combinations of the above components and conversions of expressions of the present invention between a method, an apparatus, and the like are also effective as modes of the present invention.

Advantageous Effect of Invention

According to the present invention, it is possible to acquire a state of a target object with high accuracy by use of a captured image.

BRIEF DESCRIPTION OF DRAWINGS

FIG. 11 is a diagram illustrating results of simulation of the change in luminance relative to the transmission axis angle when orientations of the p polarized light and the s polarized light are out of alignment with the x and y axes, respectively, in the present embodiment.

FIG. 21 is a diagram illustrating a relationship between a surface position of a subject having a different shape from that of FIG. 20 and a specular reflectance in the present embodiment.

FIG. 22 depicts diagrams each schematically illustrating a manner in which the phase angle is expressed as a function of the position in the capturing environment as illustrated in FIGS. 20 and 21.

FIG. 23 depicts diagrams illustrating the change in the phase angle relative to the specular reflectance and an example of drawing an object having the corresponding surface roughness in the present embodiment.

DESCRIPTION OF EMBODIMENT

Figure 1:
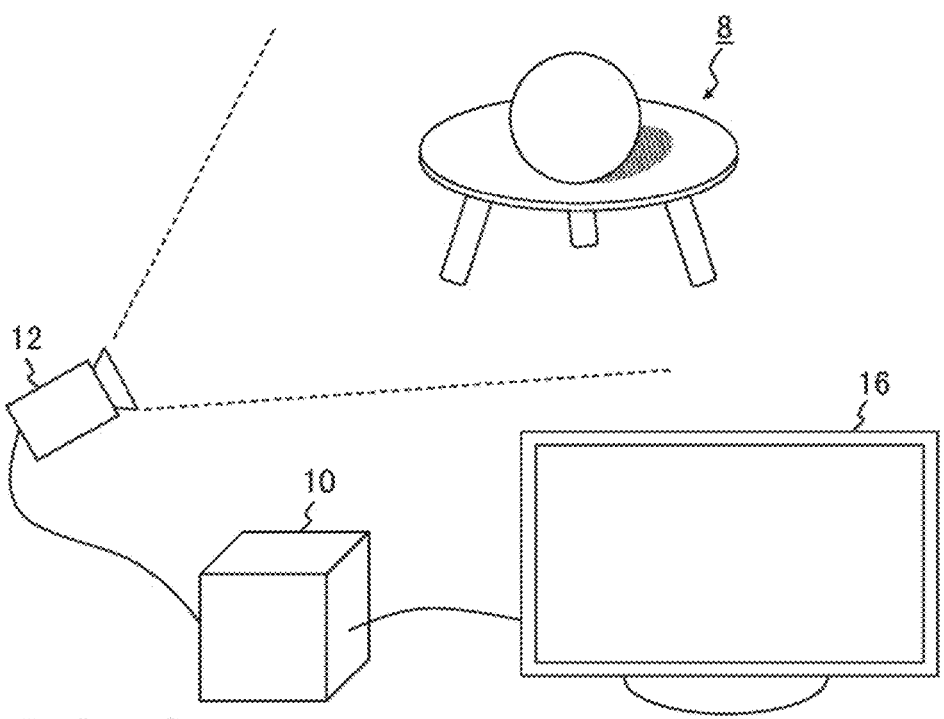
FIG. 1 is a diagram illustrating a configuration example of an information processing system in the present embodiment.

FIG. 1 illustrates a configuration example of an information processing system in the present embodiment. This information processing system includes an imaging apparatus 12, an information processing apparatus 10, and a display apparatus 16. The imaging apparatus 12 captures an image of a subject 8. The information processing apparatus 10 acquires data of the captured image and performs a given information processing task. The display apparatus 16 outputs a result of the information processing. The information processing system may further include an input apparatus that accepts operation on the information processing apparatus 10 from a user. The information processing apparatus 10 may further be capable of communicating with an external apparatus such as a server by connecting to a network such as the Internet.

The information processing apparatus 10, the imaging apparatus 12, and the display apparatus 16 may be connected by cables or wirelessly by wireless LAN (Local Area Network) or the like. Also, two or more of the information processing apparatus 10, the imaging apparatus 12, and the display apparatus 16 may be combined into an integral apparatus. For example, an information processing system may be realized by using a camera or a mobile terminal having these apparatuses. Alternatively, a head-mounted display that is worn on the user's head and displays an image in front of the user's eyes may be used as the display apparatus 16, and the imaging apparatus 12 may be provided on the head-mounted display in such a manner as to capture an image corresponding to a user's line of sight. In any case, the information processing apparatus 10, the imaging apparatus 12, and the display apparatus 16 are not limited to those illustrated in appearance and shape.

In such a system, the information processing apparatus 10 successively acquires image data captured by the imaging apparatus 12 and performs image analysis including identification of the subject's surface roughness, and then performs information processing on the basis of a result of the image analysis, generating a display image data and audio data to output the generated image data and audio data to the display apparatus 16. Here, the details of information processing performed by the information processing apparatus 10 as a result of image analysis are not specifically limited. For example, a game controller may be a given target object included in the subject 8 so that an electronic game or an arbitrary information processing task is progressed by recognizing the motion of the game controller as user operation.

Alternatively, the controller may be replaced with a virtual object in the captured image for use as a display image, or a virtual object that interacts with the subject may be drawn. A virtual world drawn in a field of view corresponding to the user's line of sight may be displayed on the head-mounted display by modeling the real world as a virtual object.

It is preferred that such a technique should identify the subject 8 and its surrounding conditions as accurately as possible. For example, in a case where another object similar in shape to the target object exists in the subject space, it is necessary to discriminately recognize silhouettes thereof. However, the manner in which a silhouette appears and the ease with which the silhouette can be extracted from a captured image change depending on various factors including surrounding brightness, light source condition, color of the target object, pattern, and shape. Therefore, it is considered that a simple process based on a common captured image does not provide constant accuracy.

Figure 2:
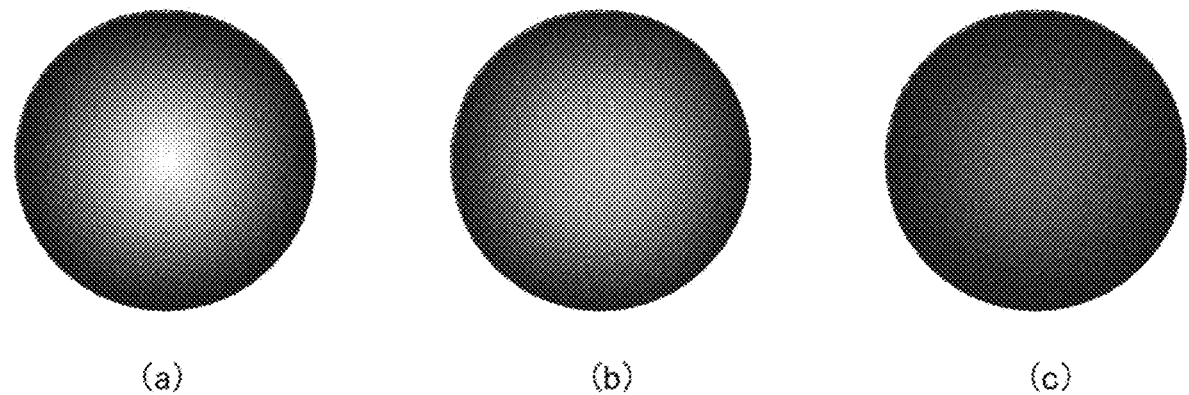
FIG. 2 depicts diagrams each illustrating a spherical silhouette of a subject in the present embodiment.

FIG. 2 illustrates spherical silhouettes of the subject 8. The silhouette in (a) has a locally high luminance at the center of the spherical silhouette. Such an image is acquired, for example, in a case where light having relatively high directivity is emitted from the front side in the figure on a sphere including a material that readily produces specular reflection. That is, it is considered that specular reflection is predominant at the center of the sphere and that diffuse reflection is predominant at portions near a contour. In this case, specular reflection is light emitted from a light source and regularly reflected on the subject surface whereas diffuse reflection is light that appears on the surface after having reached the inside of the subject and having been diffused by pigment particles. According to a dichroic reflection model, light observed by the imaging apparatus 12 is expressed, of these reflected light beams, as the sum of components in a direction of an imaging surface.

In contrast, the silhouette in (b) has lower luminance at the center portion than that of (a) with a mild change in luminance toward the outline. The silhouette in (c) has even lower luminance at the center portion, depicting no significant difference in luminance from the portions near the contour. The changes of the silhouettes in (b) and (c) relative to the silhouette in (a) may occur as a result of an increase in area of the light source. Meanwhile, a similar change also occurs as a result of an increase in surface roughness of the sphere. Here, the term "roughness" refers to variation in height or surface azimuth attributable to projections and depressions of substantially several micrometers on an object surface. It is assumed that the larger the variation, the greater the roughness. The surface roughness is a common parameter in material processing technology and other fields.

If it is impossible to distinguish whether the difference between the silhouettes as illustrated is attributable to the light source or the subject itself, it is probable that the same subject may be recognized as different objects because of the change of the light source and that another object having different surface roughness may be mistaken for the target object. Also, it is difficult to distinguish between whether specular reflected light is scattered on the surface due to a rough surface or light is scattered inside by a material that readily produces diffuse reflection. For this reason, problems may occur also in the case of distinguishing between the target object silhouettes by material and in the case of drawing a virtual object corresponding to a real object by applying a reflection model. Particularly, in a case where the target object or the imaging surface moves, the appearance changes successively due to the change in the state of reflected light, thus providing an effect that cannot be ignored also on the accuracy of subsequent processes. For this reason, the present embodiment identifies the surface roughness of a subject as a parameter that remains unaffected by the state of light by using polarization images.

Figure 3:
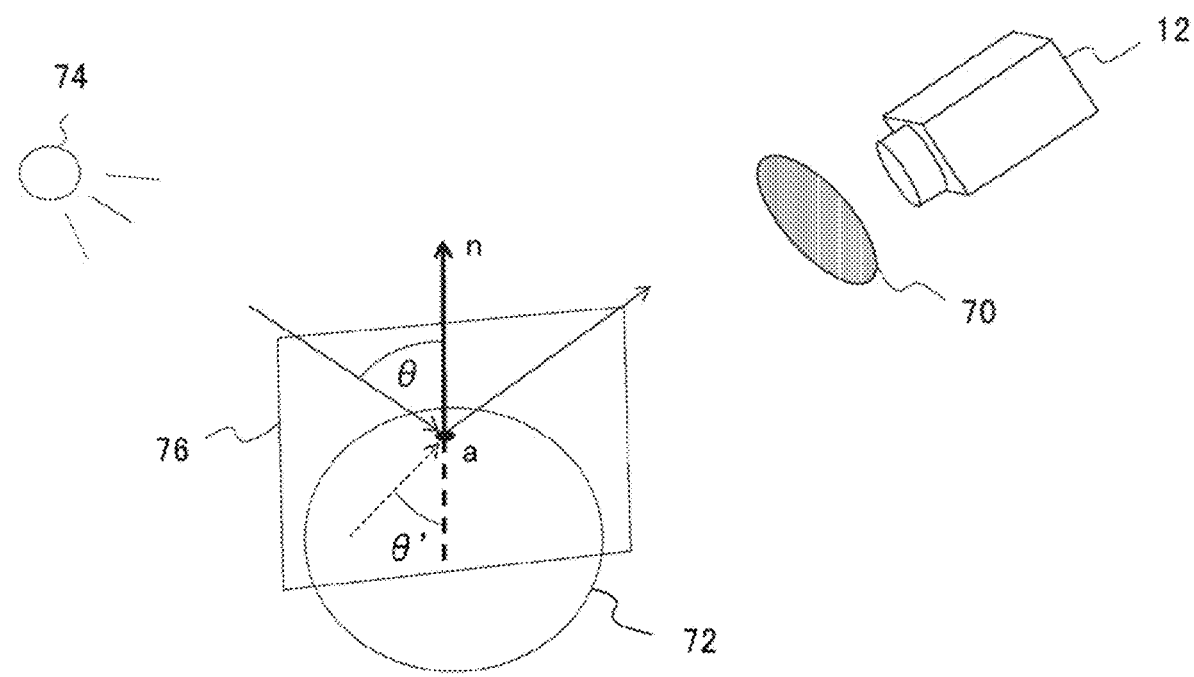
FIG. 3 is a diagram schematically illustrating a capturing environment of polarization images used in the present embodiment.

FIG. 3 schematically illustrates a capturing environment of polarization images used in the present embodiment. The imaging apparatus 12 captures an image of a space including a subject 72 via a linear polarizer plate 70. In more details, the imaging apparatus 12 observes, of reflected light that includes a specular reflection component obtained as a result of causing light emitted from a light source 74 to be reflected on the light by the subject 72 and a diffuse reflection component obtained as a result of causing the light emitted from a light source 74 to be scattered inside the subject 72, polarized light that oscillates in a direction determined by the linear polarizer plate 70. In the case of specular reflection, an angle θ formed between a normal vector n at an observation point a on the surface of the subject 72 and a light beam reaching the point a from the light source 74 is referred to as an incident angle, and a plane 76 including the light beam and the normal vector n is referred to as an incident plane. In the case of diffuse reflection, an angle θ' formed between the light beam reaching the point a from inside the subject 72 and the normal vector n is the incident angle, and the plane 76 including the light beam and the normal vector n is the incident plane.

The linear polarizer plate 70 transmits, of reflected light that reaches the imaging apparatus 12 from the observation point a, only linear polarized light oscillating in a certain direction. Hereinafter, the oscillation direction of polarized light that passes through the linear polarizer plate 70 will be referred to as a transmission axis of the linear polarizer plate 70. The rotation of the linear polarizer plate 70 about an axis vertical to its surface allows for the transmission axis to be set up in an arbitrary direction. Assuming that light that reaches the imaging apparatus 12 is non-polarized light, observed luminance is constant even if the linear polarizer plate 70 is rotated. Meanwhile, when partially polarized, common reflected light experiences change in luminance observed in the transmission axis direction. Also, the luminance changes in different ways depending on a ratio between specular reflection and diffuse reflection and the incident angle.

Figure 4:
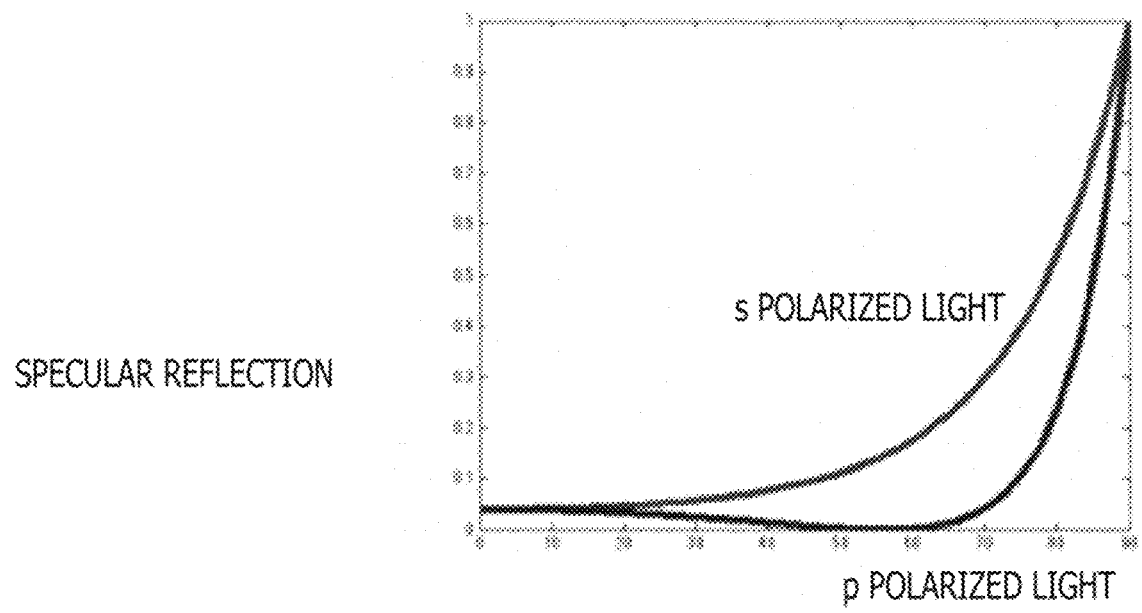
FIG. 4 is a diagram comparing change in polarization direction relative to an incident angle between specular reflection and diffuse reflection.

FIG. 4 compares change in polarization direction relative to an incident angle between specular reflection and diffuse reflection. Here, the term "s polarized light" refers to a component that oscillates in a direction vertical to the incident plane, and the term "p polarized light" refers to a component that oscillates in a direction parallel to the incident plane. In both specular reflection and diffuse reflection, the ratio between the s polarized light and the p polarized light is dependent on the incident angle. Also, the s polarized light is predominant in specular reflected light regardless of the incident angle. For this reason, the observed luminance is maximum when the transmission axis of the linear polarizer plate 70 is vertical to the incident plane, and the observed luminance is minimum when the transmission axis of the linear polarizer plate 70 is parallel to the incident plane.

Diffuse reflected light is the opposite thereof. The observed luminance is maximum when the transmission axis of the linear polarizer plate 70 is parallel to the incident plane, and the observed luminance is minimum when the transmission axis of the linear polarizer plate 70 is vertical to the incident plane. Therefore, the change in luminance obtained by capturing polarization images in various directions of the transmission axis includes information regarding a contained ratio between specular reflection component and diffuse reflection component and incident angle. The present embodiment also takes advantage of such a change in luminance of polarized light.

Figure 5:
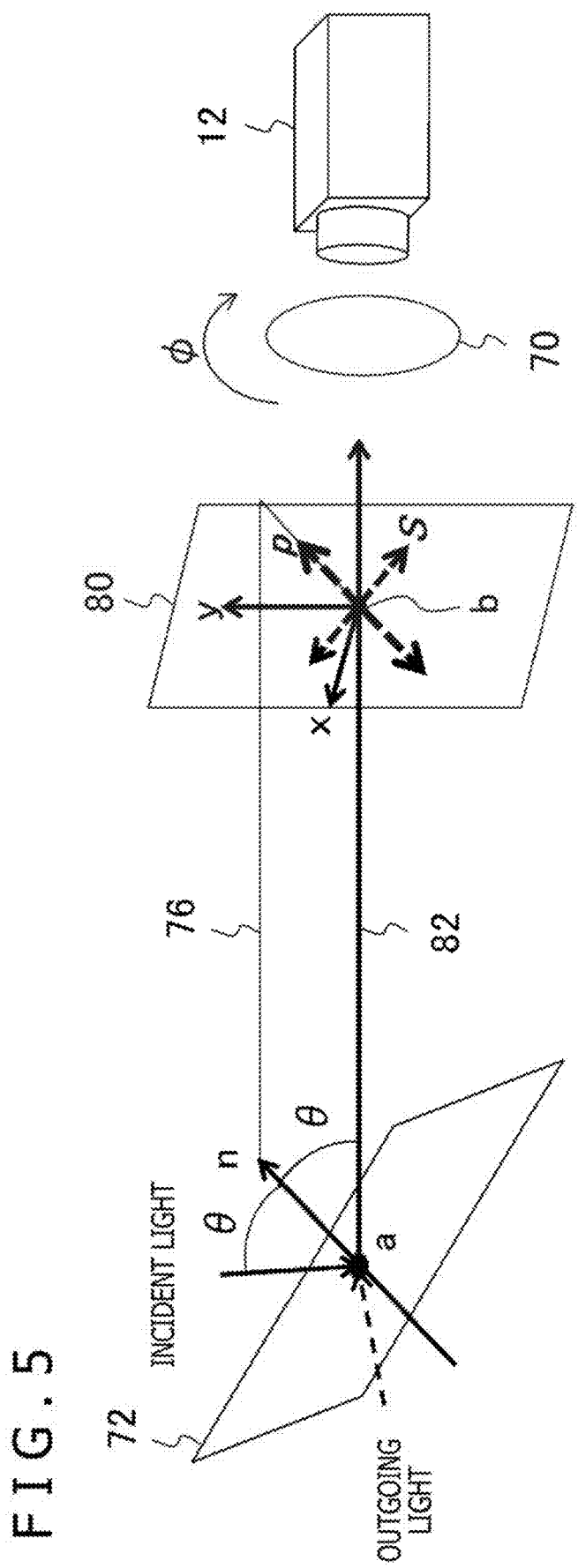
FIG. 5 is a diagram for describing definitions of parameters used in the present embodiment.

FIG. 5 is a diagram for describing definitions of parameters used in the present embodiment. As in FIG. 3, a silhouette of the observation point a is formed at a position b on a virtual image plane 80 by a light beam 82 that reaches the imaging apparatus 12 from the observation point a on the subject 72 through the linear polarizer plate 70. Here, as illustrated on the image plane 80, the position b where an image is formed is assumed to be an origin, and the horizontal rightward direction as seen from the imaging apparatus 12 is denoted as an x axis, the vertical upward direction is denoted as a y axis, and the angle formed between the transmission axis of the linear polarizer plate 70 and the x axis is denoted as a polarization azimuth φ. As described above, a behavior of luminance I observed at the position b with change in the polarization azimuth φ is determined by the ratio between specular reflection component and diffuse reflection component and the incident angle θ. Also, the s polarized light and the p polarized light are light beams that oscillate vertically and horizontally to the incident plane 76, respectively.

Figure 6:
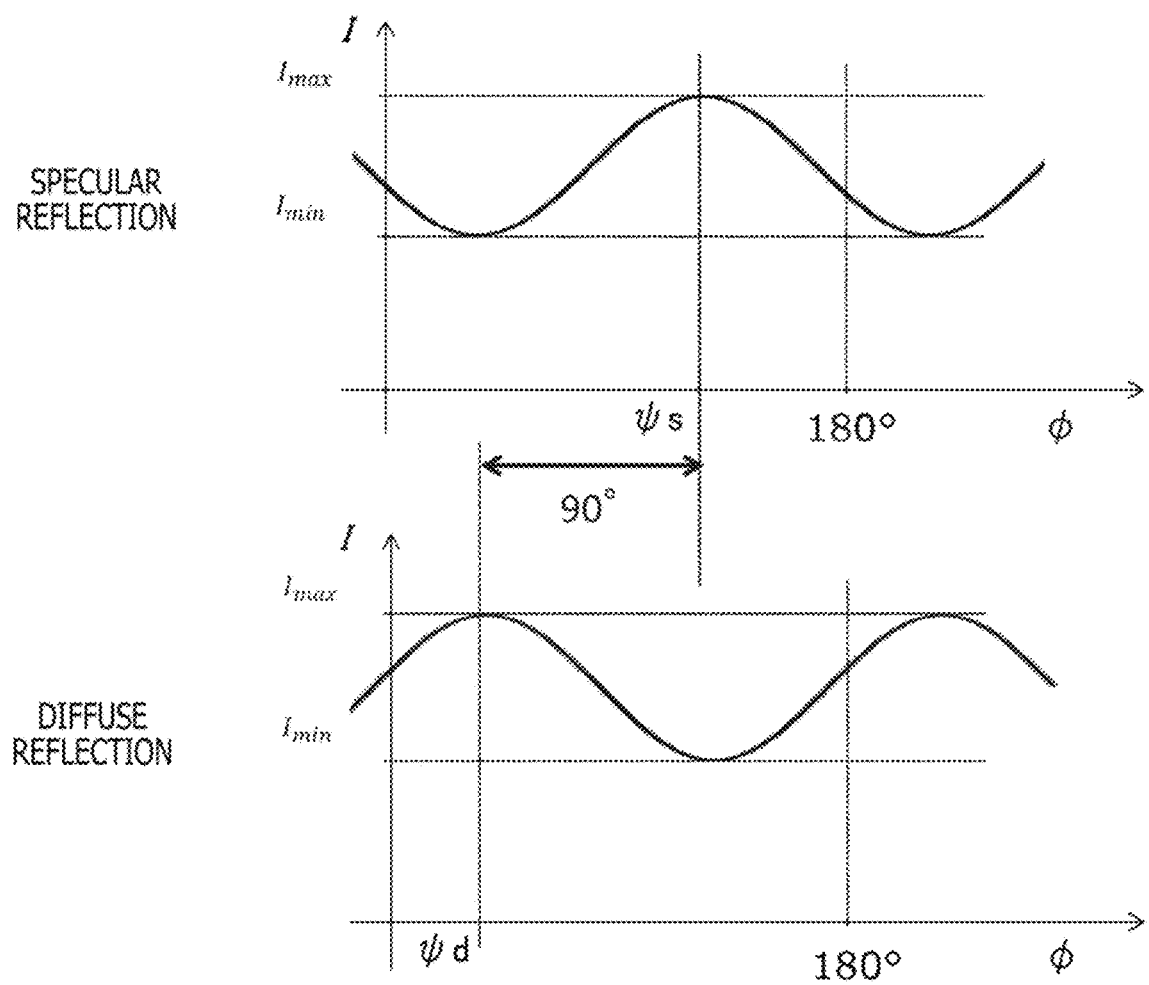
FIG. 6 is a diagram illustrating change in luminance relative to a polarization azimuth in the present embodiment.

FIG. 6 illustrates change in luminance I relative to the polarization azimuth φ. The graph on the upper side in FIG.

6 illustrates a case where light that reaches the imaging apparatus 12 is only specular reflection, and the graph on the lower side in FIG. 6 illustrates a case where light is only diffuse reflection, and each is in a shape of a sine wave with a 180° period. Meanwhile, a polarization azimuth φs when the luminance I in specular reflection has a maximum value Imax differs by 90° from the polarization azimuth φd when the luminance I in diffuse reflection has the maximum value Imax. This is attributable, as illustrated in FIG. 4, to the fact that the s polarized light is predominant in specular reflection and that the p polarized light is predominant in diffuse reflection. Considering the fact that the s polarized light is vertical to the incident plane and that the p polarized light is horizontal to the incident plane, the polarization azimuth (φs—90°) that provides the lowest luminance in specular reflection or the polarization azimuth φd that provides the highest luminance in diffuse reflection represents the angle on the image plane of the incident plane. The angle of interest is commonly referred to as an azimuth angle.

Hereinafter, the polarization azimuth that provides the maximum luminance of observed polarized light will be referred to as a phase angle φ regardless of the contained ratio between specular reflection and diffuse reflection. The change in the luminance I illustrated in FIG. 6 can be expressed by the following formula.

[Math. 1] $I=I_{max}+I_{min}/2+I_{max}-I_{min}/2 \cos(2\phi-2\psi)$ (Formula 1)

Figure 7:
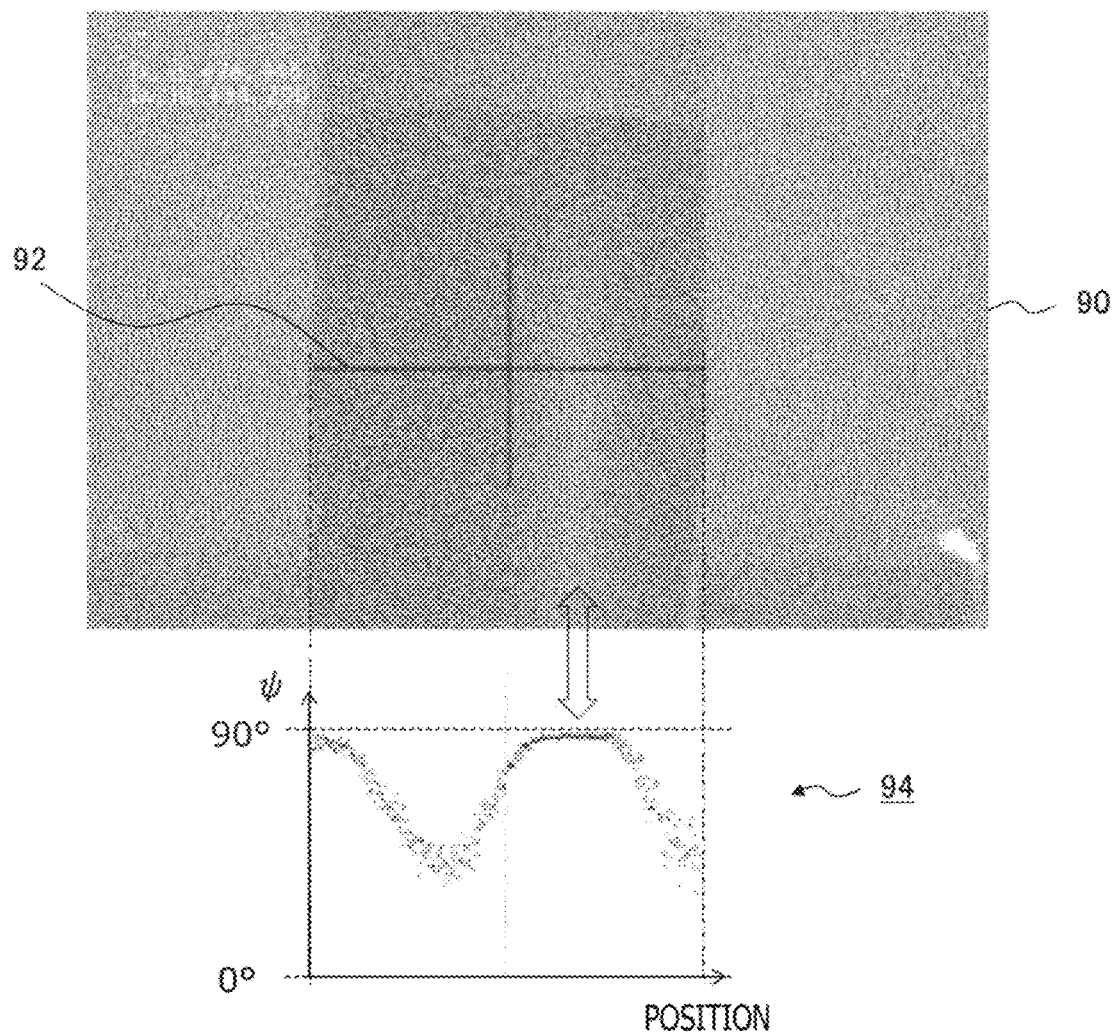
FIG. 7 is a diagram illustrating results of change in phase angle acquired from an actual captured image in the present embodiment.

FIG. 7 illustrates results of the change in the phase angle φ acquired from an actual captured image. A captured image 90 of a cylindrical subject is illustrated on the upper side in FIG. 7, and a change 94 in the phase angle φ on a line 92 on the image plane is illustrated on the lower side in FIG. 7. The phase angle φ is acquired by extracting, from a plurality of polarization images captured with different transmission axis angles, luminance of each of the pixels included in the line 92 and obtaining the change in luminance relative to the polarization azimuth as illustrated in FIG. 6.

At this time, observed luminance values are acquired only relative to discrete polarization azimuths and are therefore approximated to a function in the form of Formula 1 by using a least squares method or the like. In the captured image 90, of the subject's silhouette, a portion indicated by an arrow is locally high in luminance, thus suggesting that specular reflection is predominant. When the azimuth angle is set to the horizontal direction (0°) because of a cylindrical shape, the phase angle φ of specular reflected light is theoretically 90°, and this value is also acquired in the change 94 in the phase angle φ depicted on the lower side. In other portions where a diffuse reflection component is considered to be predominant, on the other hand, there is no region where the phase angle φ is 0°. The present inventor conceived that such a change in the phase angle φ is brought about by not only the ratio between reflection components but also the surface roughness of the subject. A description will be given next of the principle.

Figure 8:
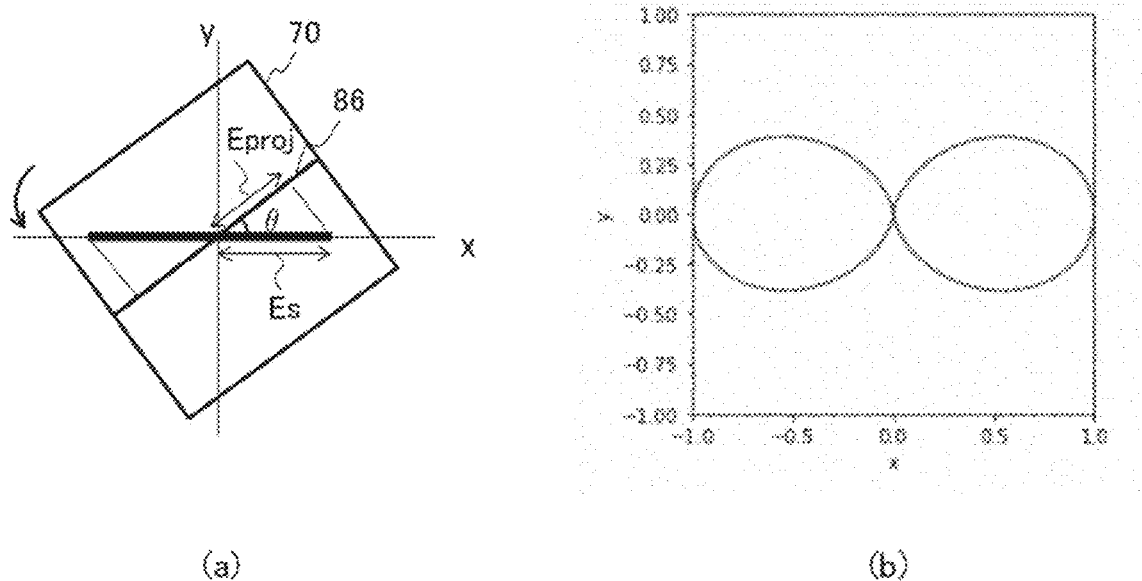
FIG. 8 depicts diagrams each illustrating a relationship between a transmission axis angle and luminance on the assumption that only s polarized light is observed in the present embodiment.

FIG. 8 illustrates a relationship between the transmission axis angle and the luminance on the assumption that only the s polarized light is observed. (a) illustrates a manner in which the linear polarizer plate 70 having a transmission axis 86 is rotated about an xy plane. It should be noted that, in this figure, the azimuth angle is the y-axis direction and that the s polarized light vertical thereto oscillates in the x axis. The same is also true for the description given below. In a case where only the s polarized light reaches the imaging apparatus 12, the luminance is maximum when the transmission axis 86 is in the direction of the x axis and minimum when the transmission axis 86 is in the direction of the y axis. If this is generalized by denoting the angle of the transmission axis 86 relative to the x axis as θ, an electric field component of the s polarized light to be incident as Es, and the electric field component that passes through the polarizer plate as $E_{proj}$, the following relationship holds:

$$E_{proj}=Es \cos\theta$$

Hence, the observed luminance I changes in the following manner relative to the angle θ:

$$I=E_{proj2}=Es^2 \cos^2\theta$$

Figure 9:
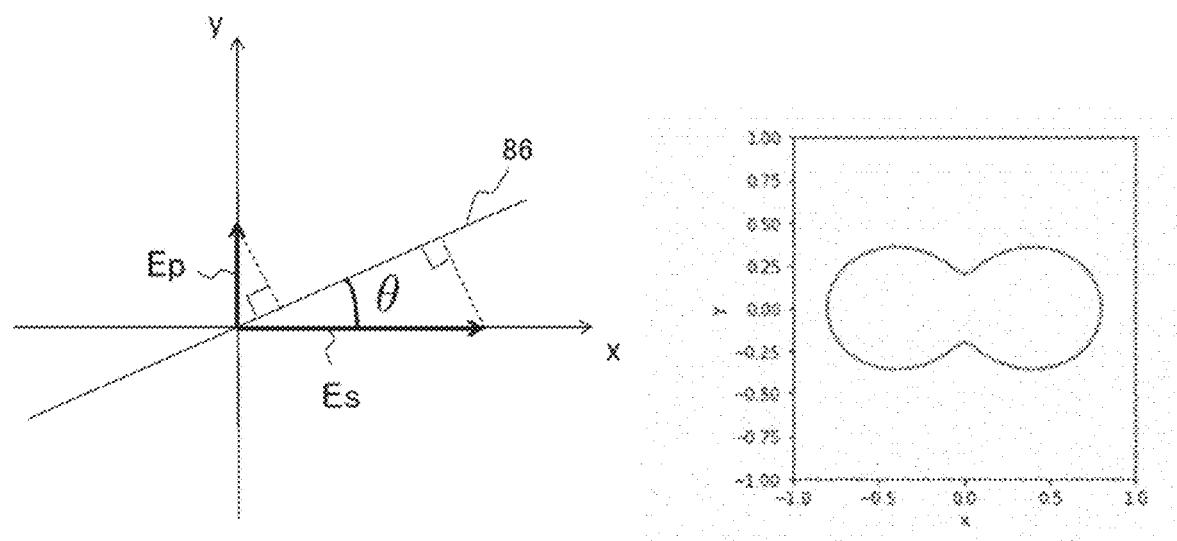
FIG. 9 depicts diagrams each illustrating a relationship between the transmission axis angle and the luminance in the case where p polarized light is mixed in light observed in the assumption made in FIG. 8.

(b) of FIG. 8 is a graph illustrating the normalized luminance I with a maximum value of 1.0 expressed on a two-dimensional plane with x=I cos θ and y=I sin θ. For example, when the transmission axis matches θ=0°, i.e., the x axis (y=0), the luminance I has the maximum value of 1.0, and when the transmission axis matches θ=90°, i.e., the y axis (x=0), the luminance I has the minimum value of 0. FIG. 9 illustrates a relationship between the transmission axis angle and the luminance in a case where the p polarized light is mixed in light observed in the assumption made in FIG. 8. (a) is a diagram similar to (a) of FIG. 8, and the x axis is in the oscillation direction of the s polarized light, and the angle formed between the transmission axis 86 and the x axis is denoted as θ. It is assumed, however, that incident light includes not only the s polarized light of an electric field component Es but also the p polarized light of an electric field component Ep. In this case, the luminance I that is observed after passing through the polarizer plate changes in the following manner relative to the angle θ:

$$I=Es^2 \cos^2\theta+Ep^2 \sin^2\theta$$

(b) of FIG. 9 illustrates the luminance I in this case in a similar form to (b) of FIG. 8. It should be noted, however, that because Es:Ep=0.8:0.2, the maximum value of the luminance I is 0.8. The comparison demonstrates that the case in FIG. 9 differs from that in FIG. 8 in that when the transmission axis matches θ=90°, i.e., the y axis (x=0), the luminance I is not 0 due to the presence of the p polarized light. In contrast, the luminance I is maximum when the transmission axis matches θ=0°, i.e., the x axis (y=0), as in the case illustrated in FIG. 8. That is, in a case where the s polarized light is predominant as in specular reflection, the angle that provides the maximum luminance, i.e., the phase angle φ, remains unchanged at 0° even if the p polarized light is mixed.

Figure 10:
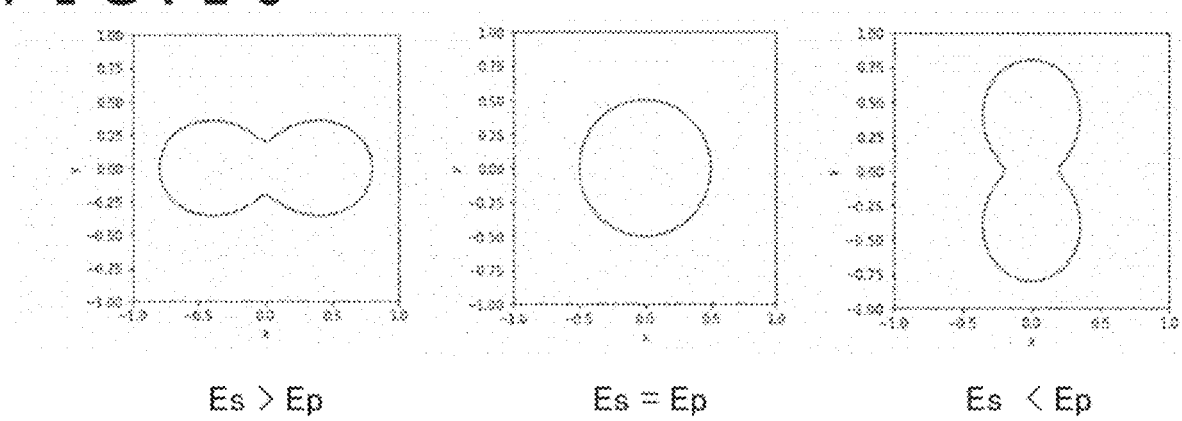
FIG. 10 is a diagram illustrating a relationship in magnitude between the s polarized light and the p polarized light included in the observed light and correspondence with the relationship between the transmission axis angle and the luminance, in the present embodiment.

FIG. 10 illustrates a relationship in magnitude between the s polarized light and the p polarized light included in the observed light and correspondence with the relationship between the transmission axis angle and the luminance. The graph on the left depicts change in luminance when the s polarized light is greater than the p polarized light and corresponds to (b) of FIG. 9. The graph at the center depicts the change in luminance when the s polarized light is equal in ratio to the p polarized light, and the graph on the right depicts the change in luminance when the p polarized light is greater than the s polarized light. As described above, when the s polarized light is larger in ratio, the phase angle φ=0°. Conversely, when the ratio is reversed, the phase angle φ=90°. That is, according to the above theory, the phase angle φ is either 0° or 90° with a boundary point at the state where the s polarized light and the p polarized light are equal in ratio and does not have any intermediate value.

It should be noted that, for the phase angle φ here, the s polarized light oscillates in the direction of the x axis. Meanwhile, the phase angle φ changes mildly in actual measurements illustrated in FIG. 7. A subject surface roughness parameter is introduced to explain this phenomenon. That is, in the example described so far, it has been assumed that a specular reflection component is reflected uniformly toward a regular reflection direction from incident light as illustrated in FIG. 5. In contrast, in a case where the surface is rough, that is, there are minute projections and depressions on the surface, the orientation of the normal vector changes from one minute area to another. As a result, a specular reflection component is not reflected in a uniform direction, and the reflection direction has, instead, a distribution.

For this reason, even if the s polarized light is oriented, as a whole surface, in the azimuth angle of the subject in such a manner as to match the x axis as has been described so far, there may be a case where the orientation of the s polarized light may be misaligned with the x axis when inspected in detail with micrometer levels. FIG. 11 is a diagram illustrating results of simulation of the change in luminance relative to the transmission axis angle when the orientations of the p polarized light and the s polarized light are out of alignment with the x and y axes, respectively. It should be noted, however, that Es:Ep=0.8:0.2. The upper side of FIG. 11 illustrates a manner in which the linear polarizer plate 70 having the transmission axis 86 is rotated about the xy plane similarly to (a) of FIG. 8. Here, the azimuth angle, i.e., the angle of the oscillation direction of the p polarized light relative to the y axis, is denoted as α as illustrated.

Of the change in luminance illustrated on the lower side, the oscillation direction of the s polarized light matches the x axis when α=0° illustrated on the left. This is nothing but the example illustrated in (b) of FIG. 9. Therefore, the luminance has the maximum value when the transmission axis 86 matches the x axis. That is, the phase angle φ=0°. In contrast, when α=90° illustrated on the right, the oscillation direction of the s polarized light matches the y axis. For this reason, the luminance has the maximum value when the transmission axis 86 matches the y axis. It should be noted that this situation is, as a result, the same as the condition on the right in FIG. 10 in which the s polarized light is mixed with the p polarized light that oscillates in the direction of the y axis to a certain degree. In this case, the phase angle satisfies the relation φ=90°.

Figure 12:
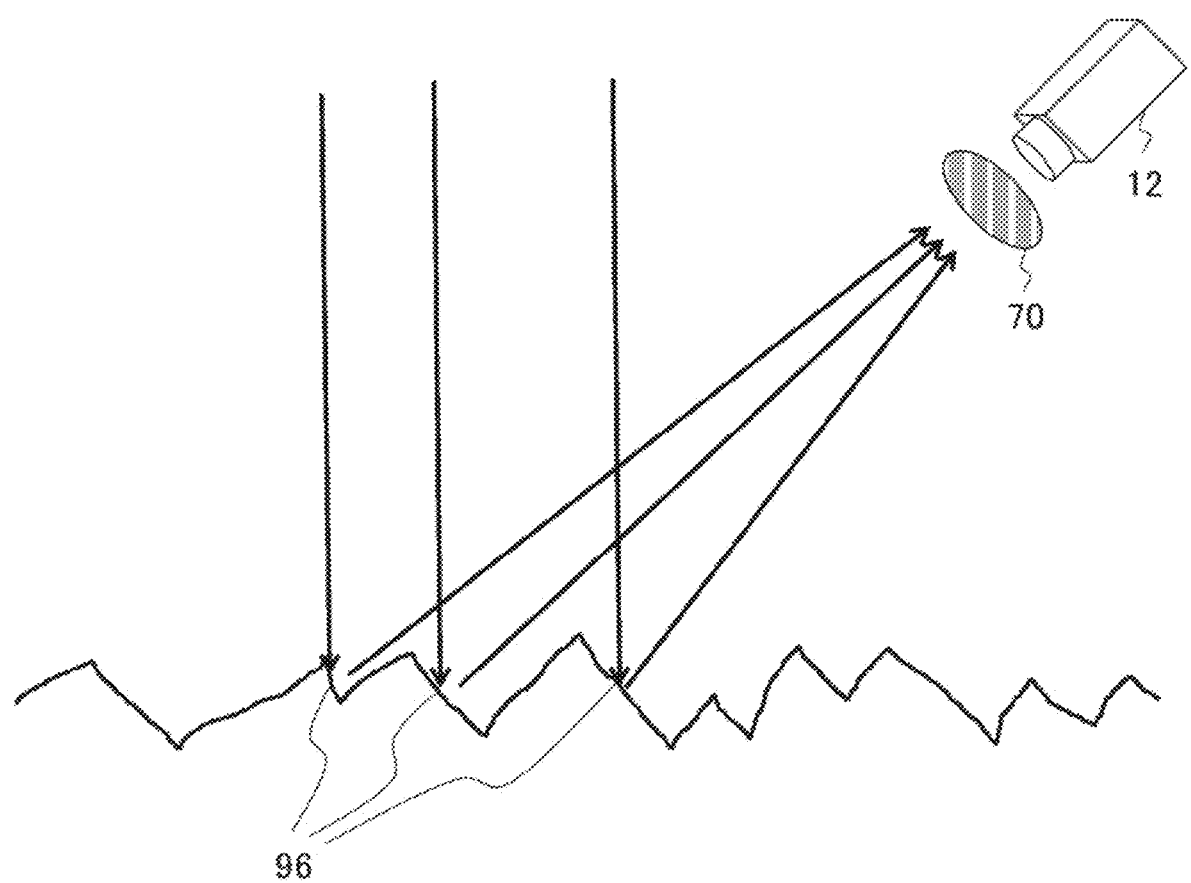
FIG. 12 is a diagram illustrating a manner in which surface roughness and a polarization state are modeled in the present embodiment.

Also, in a case where the relation α=30° or 60° is satisfied, the transmission axis that provides the maximum luminance has an inclination equivalent to that amount relative to the x axis. In a case where the azimuth angle α is defined relative to the y axis as illustrated, the phase angle φ of light with a high ratio of the s polarized light relative to the x axis is equal to the azimuth angle α. Because the azimuth angle is dependent on the orientation of the normal vector on the subject surface, it can be said that the phase angle φ, as a result, changes dependently on the normal vector. FIG. 12 illustrates a manner in which surface roughness and a polarization state are modeled. In a case where there are minute projections and depressions on the subject surface as illustrated, light observed by the imaging apparatus 12 through the linear polarizer plate 70 is a superposition of reflected light beams from minute planes 96 having different normal directions.

Figure 13:
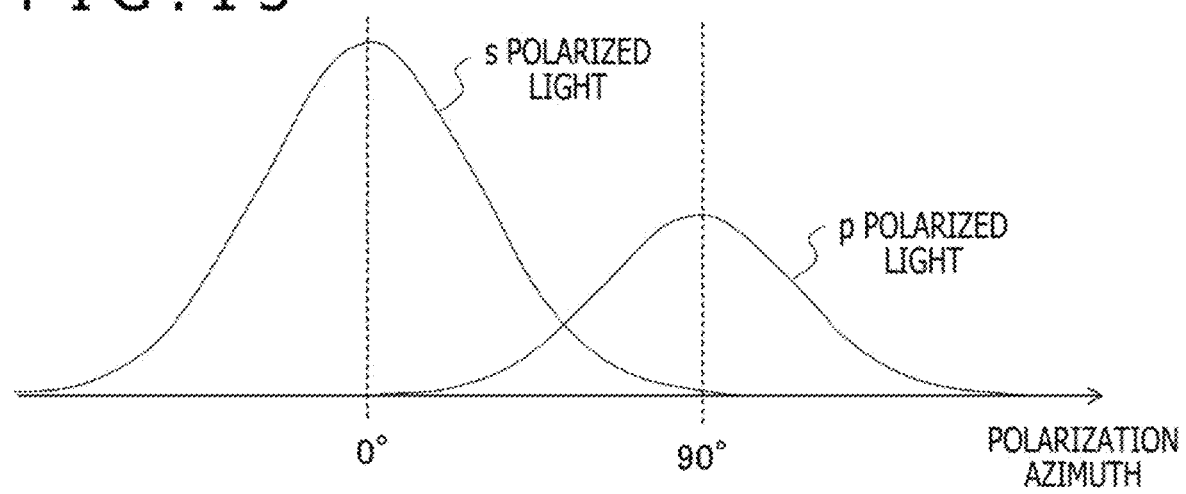
FIG. 13 is a diagram for describing a relationship between normal vector directions of minute planes and the phase angle when the normal vector direction has a normal distribution in the present embodiment.

Therefore, the phase of polarized light is also a superposition of these reflected light beams. FIG. 13 is a diagram for describing a relationship between normal vector directions of minute planes and the phase angle φ when the normal vector directions have a normal distribution. Assuming, in FIG. 13, that the center value of the s polarized light is 0°, if the normal vector direction has a normal distribution, the azimuth of the s polarized light also has a normal distribution around 0°. Also, the azimuth of the p polarized light has a normal distribution around 90°. In a case where specular reflection is predominant, the s polarized light is significantly higher in ratio than the p polarized light as illustrated. Therefore, the superposition thereof also provides the maximum 0° polarization azimuth component. As a result, the phase angle φ is 0°.

In a case where diffuse reflection is predominant, the p polarized light is significantly higher in ratio than the s polarized light. Therefore, the superposition thereof also provides the maximum 90° polarization azimuth component. As a result, the phase angle φ is 90°. In contrast, if specular reflection and diffuse reflection are mixed in the same level, the s polarized light and the p polarized light are also comparable in component ratio. The superposition thereof makes it highly likely that the polarization azimuth that provides the maximum component occurs between 0° and 90°. As a result, the phase angle φ has an intermediate value between 0° and 90°.

Figure 14:
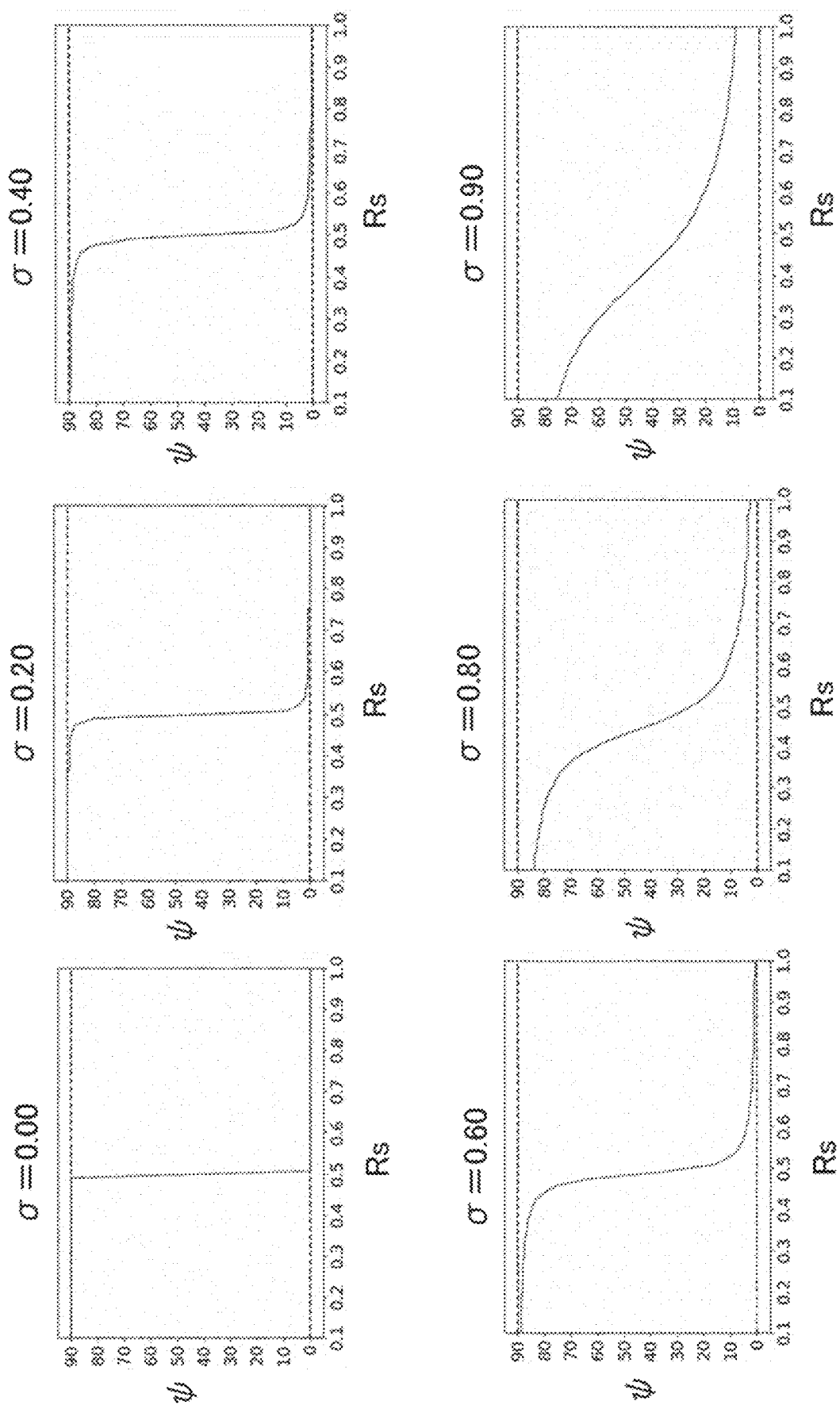
FIG. 14 is a diagram illustrating results of simulation of the change in phase angle relative to the specular reflectance when a subject surface is modeled as a set of minute planes having different normal directions in the present embodiment.

FIG. 14 is a diagram illustrating results of simulation of the change in phase angle φ relative to a specular reflectance Rs when a subject surface is modeled as a set of minute planes having different normal directions. Here, it is assumed that there are 40000 minute planes and that the azimuth angles of these minute planes are normally distributed about the y axis with a standard deviation (90*σ°). Here, σ represents the extent of variation in the azimuth angle, and by extension, the surface roughness. It is also assumed that the ratio between the s polarized light and the p polarized light in specular reflected light is 0.7:0.3, that the ratio between the s polarized light and the p polarized light in diffuse reflected light is 0.3:0.7, and that a diffuse reflectance Rd is constant at 0.5.

According to the above condition, when the relation σ=0 is satisfied, that is, when the surface is completely smooth, the ratio between the s polarized light and the p polarized light is reversed starting at the specular reflectance Rs of 0.5, with their directions remaining constant. As a result, the phase angle φ also changes suddenly as described above. Specifically, when the specular reflectance Rs is smaller than 0.5, the p polarized light is greater in ratio. As a result, the phase angle φ is 90°. When the specular reflectance Rs is greater than 0.5, the s polarized light is greater in ratio. As a result, the phase angle φ is 0°. In contrast, if σ takes a value other than 0, the polarization azimuths of the p polarized light and the s polarized light also have distributions as illustrated in FIG. 13 because of the distribution of the normal vector angle. As a result, at a transition period when the relationship in magnitude between the s polarized light and the p polarized light is reversed, the phase angle φ resulting from the superposition thereof takes on an intermediate value. Also, the greater σ, the more moderate the change in the phase angle φ.

Figure 15:
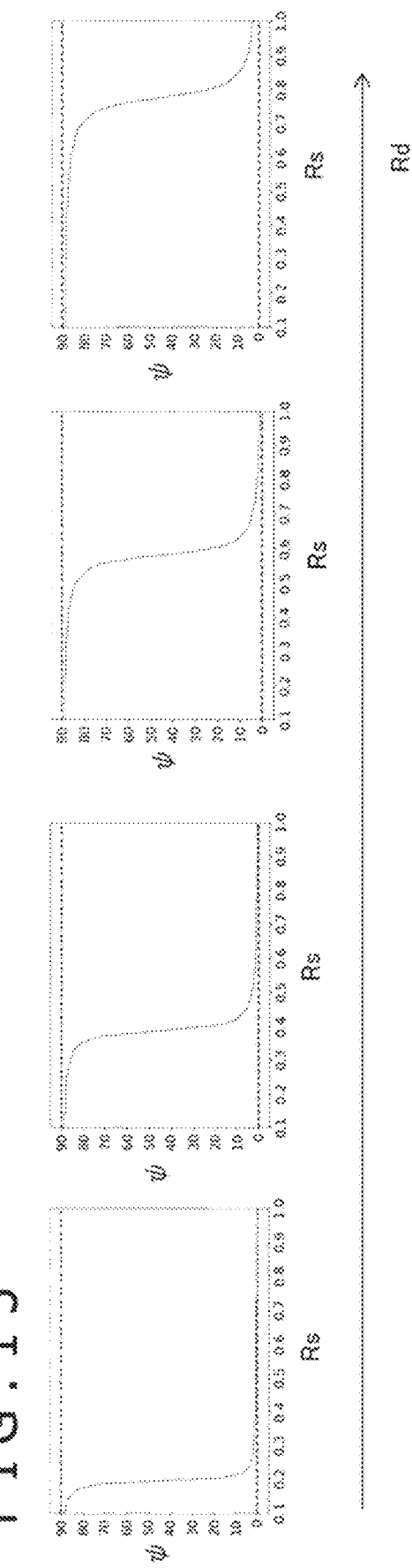
FIG. 15 is a diagram illustrating the change in phase angle relative to the specular reflectance when a diffuse reflectance is changed in the present embodiment.

FIG. 15 illustrates the change in the phase angle φ relative to the specular reflectance Rs when the diffuse reflectance Rd is changed in approximately the same condition as in FIG. 14. Here, the relation σ=0.60 is set, and the diffuse reflectance Rd increases from left to right in the figure. As the diffuse reflectance Rd increases, the specular reflectance Rs when the ratio between the s polarized light and the p polarized light is reversed increases. Accordingly, a range in which the phase angle φ changes also shifts. However, if σ is equal, the phase angle φ changes at the same proportion.

Figure 16:
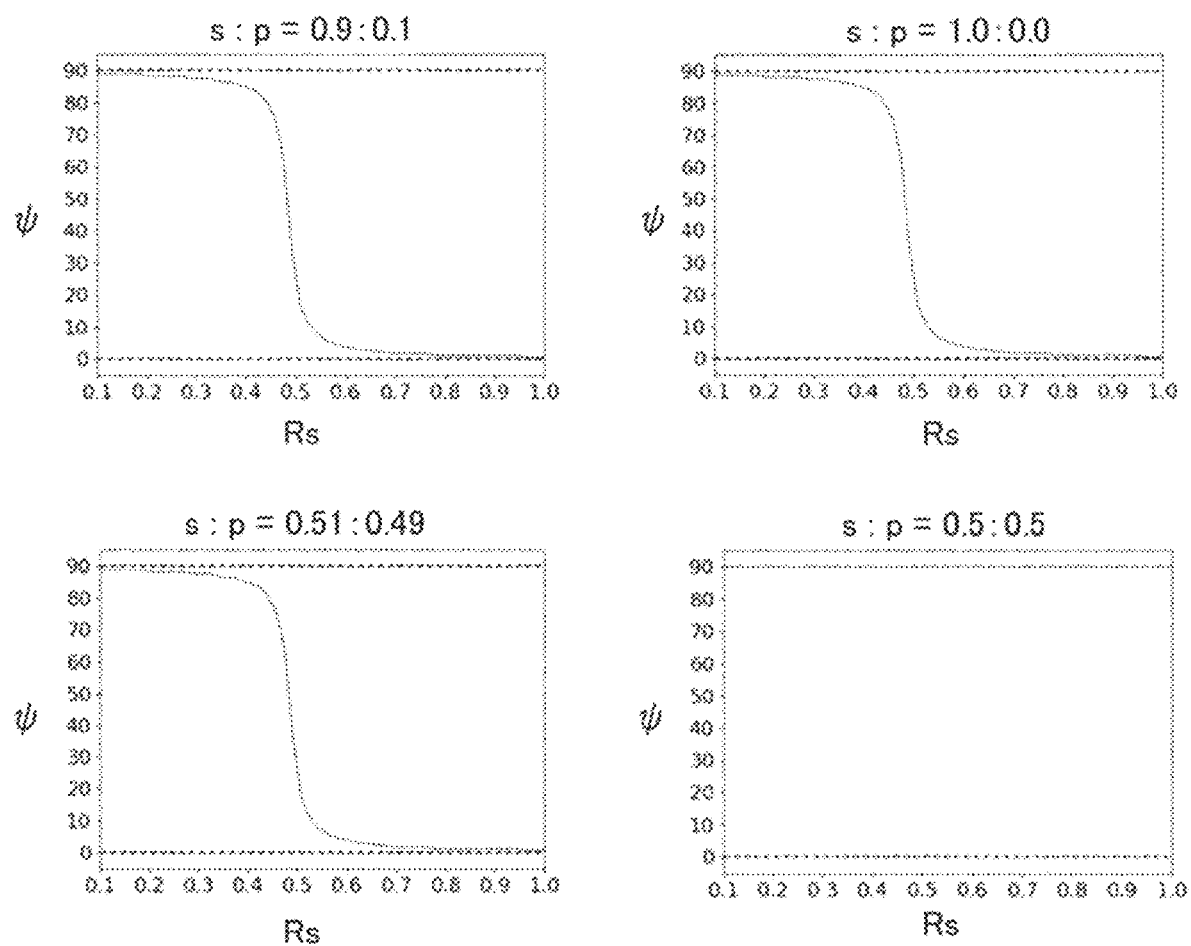
FIG. 16 is a diagram illustrating the change in phase angle relative to the specular reflectance when a ratio between the s polarized light and the p polarized light in specular reflected light is changed in the present embodiment.

FIG. 16 illustrates the change in the phase angle φ relative to the specular reflectance Rs when the ratio between the s polarized light and the p polarized light in specular reflected light is changed under substantially the same condition as that of FIG. 14. Here, it is assumed that the relation σ=0.60 is satisfied. It should be noted that, although the ratio between the s polarized light and the p polarized light in specular reflected light is denoted as s:p in FIG. 16, the ratio between the s polarized light and the p polarized light in diffuse reflected light changes at the same time in the proportion of 1-s:1-p. When s:p=0.5:0.5 as illustrated on the lower right side in FIG. 16, a non-polarization state is achieved in which the s polarized light and the p polarized light are equal regardless of the specular reflectance. As a result, the phase angle φ does not exist.

In other states, the phase angle φ changes in the same manner relative to the specular reflectance regardless of the s:p ratio. That is, as illustrated on the lower left side in FIG. 16, if there is a slight difference between the s polarized light and the p polarized light, and by extension, even if a degree of polarization is low, change in the phase angle φ worthy of evaluation can be acquired. Also, as illustrated in FIG. 4, the ratio between the s polarized light and the p polarized light changes dependently on the incident angle to the subject. From the results depicted in FIG. 4, therefore, the change in the phase angle φ is not dependent on the incident angle. From the above, it is clear that the manner in which the phase angle φ changes from 90° to 0° with increase in the specular reflectance represents the surface roughness independently of the degree of polarization, the incident angle, and the diffuse reflectance. For this reason, the information processing apparatus 10 of the present embodiment identifies the surface roughness of the subject by evaluating the manner of change in question on the basis of a given reference.

Figure 17:
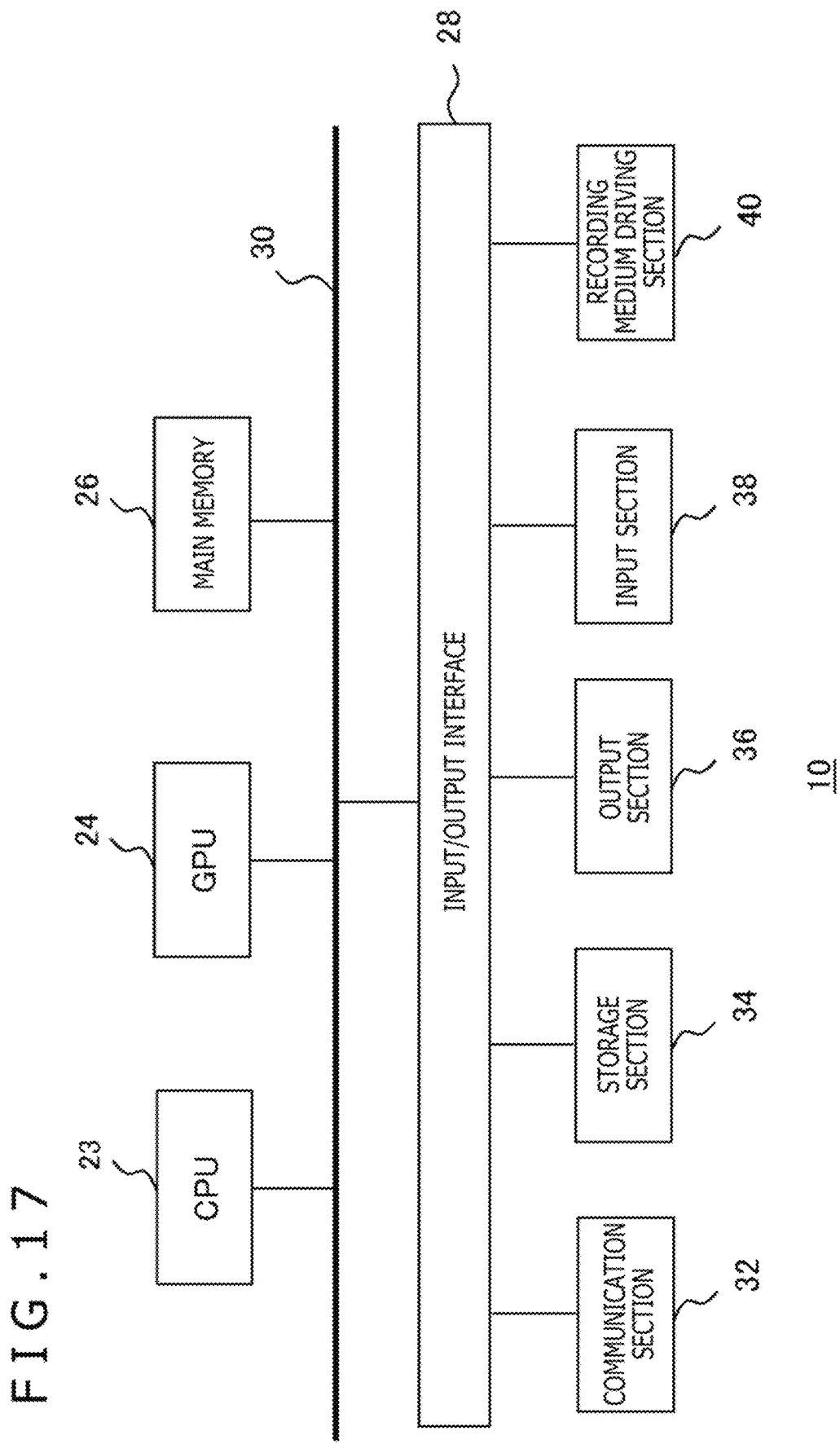
FIG. 17 is a diagram illustrating an internal circuit configuration of an information processing apparatus in the present embodiment.

FIG. 17 illustrates an internal circuit configuration of the information processing apparatus 10. The information processing apparatus 10 includes a CPU (Central Processing Unit) 23, a GPU (Graphics Processing Unit) 24, and a main memory 26. These sections are connected to each other via a bus 30. An input/output interface 28 is further connected to the bus 30. A communication section 32, a storage section 34, an output section 36, an input section 38, and a recording medium driving section 40 are connected to the input/output interface 28. The communication section 32 includes a peripheral equipment interface such as a USB (Universal Serial Bus) or IEEE (Institute of Electrical and Electronic Engineers) 1394 and a wired or wireless LAN network interface. The storage section 34 includes a hard disk drive or a non-volatile memory. The output section 36 outputs data to the display apparatus 16. The input section 38 receives data input from the imaging apparatus 12 and an input apparatus that is not illustrated. The recording medium driving section 40 drives a removable recording medium such as a magnetic disk, an optical disc, or a semiconductor memory.

The CPU 23 controls the information processing apparatus 10 as a whole by executing an operating system stored in the storage section 34. The CPU 23 also executes various programs read out from the removable recording medium and loaded into the main memory 26 or downloaded via the communication section 32. The GPU 24 has a geometry engine function and a rendering processor function, performing a drawing process in accordance with a drawing instruction from the CPU 23 and storing display image data in a frame buffer that is not illustrated. Then, the GPU 24 converts the display image stored in the frame buffer into a video signal, outputting the signal to the output section 36. The main memory 26 includes a RAM (Random Access Memory) and stores programs and data required for processing.

Figure 18:
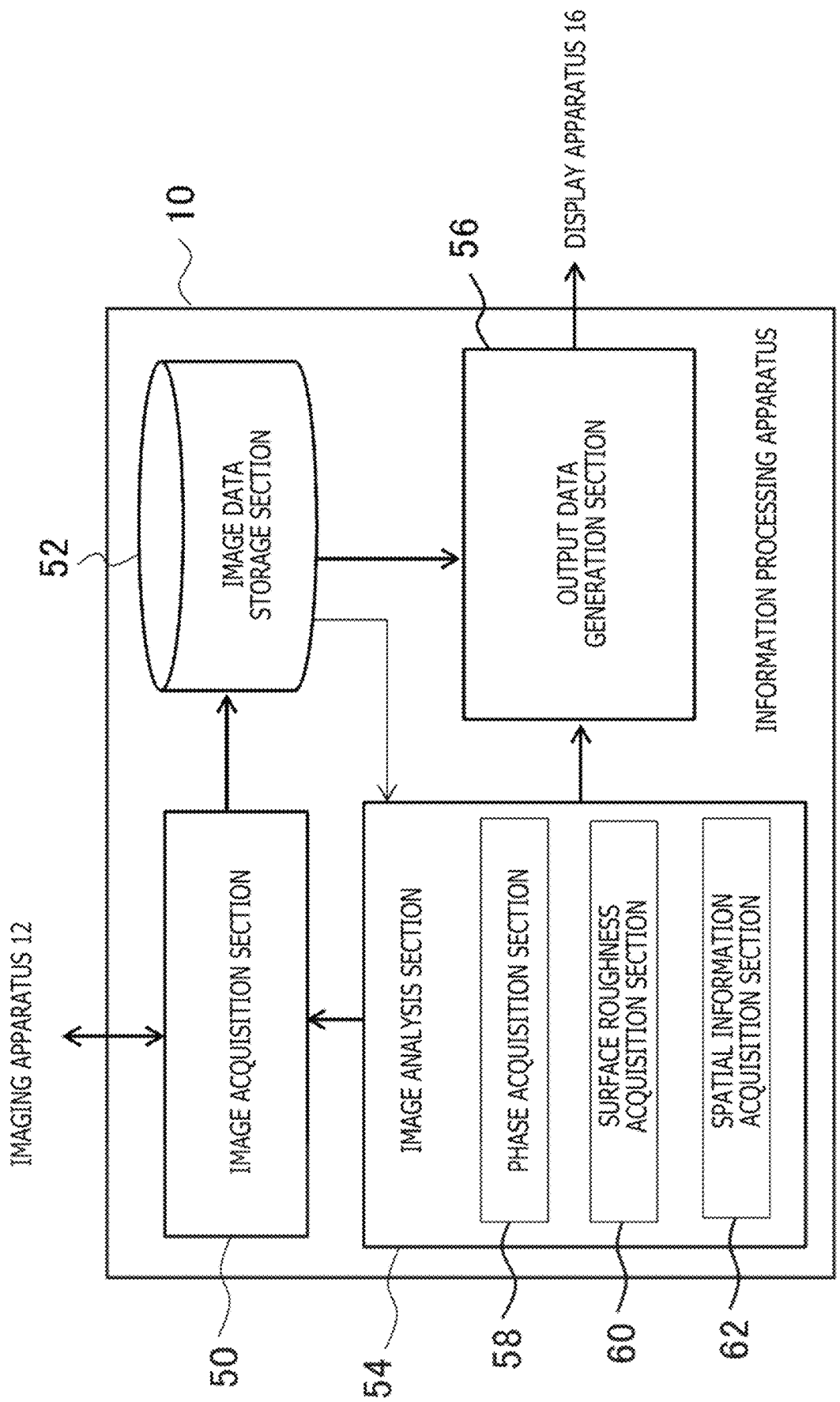
FIG. 18 is a diagram illustrating a functional block configuration of the information processing apparatus in the present embodiment.

FIG. 18 illustrates a functional block configuration of the information processing apparatus 10 of the present embodiment. Each element recited as a functional block for performing various processing tasks in FIG. 18 can be configured by hardware such as various circuits including the CPU 23, the GPU 24, and the main memory 26 illustrated in FIG. 17 and can be realized by software such as programs loaded into the main memory 26 from the recording medium driven by the recording medium driving section 40 and the storage section 34. Therefore, it is understood by a person skilled in the art that these functional blocks can be realized in various ways including hardware alone, software alone, and a combination thereof, and the functional blocks are not limited to any one of them.

The information processing apparatus 10 includes an image acquisition section 50, an image data storage section 52, an image analysis section 54, and an output data generation section 56. The image acquisition section 50 acquires captured image data from the imaging apparatus 12. The image data storage section 52 stores acquired image data. The image analysis section 54 performs image analysis including identification of the surface roughness of the subject that appears in the captured image. The output data generation section 56 generates data to be output by using analysis results.

The image acquisition section 50 is realized by the input section 38, the CPU 23, and the like in FIG. 17 and acquires captured image data including polarization images from the imaging apparatus 12. At this time, the image acquisition section 50 acquires, as the polarization images, at least polarization image data with three azimuths corresponding to transmission axes in three directions. A polarization image may be captured each time the linear polarizer plate 70, provided in front of the imaging apparatus 12 as illustrated in FIG. 3, is rotated and stopped in a given direction. Alternatively, polarization images may be captured by introducing an image sensor whose imaging device has a polarization layer including polarizers oriented in a plurality of directions as will be described later. In this case, polarization images in a plurality of azimuths can be acquired on a single occasion of image capture.

Depending on the purpose of information processing and the details of image analysis as in a case where a captured image is displayed on the display apparatus 16, the image acquisition section 50 may further acquire common color captured image data. Also, captured images to be acquired may be a video or still images. The image acquisition section 50 successively stores acquired captured image data in the image data storage section 52. The image analysis section 54 is realized by the CPU 23, the GPU 24, and the like and performs image analysis including acquisition of the surface roughness of the subject by using the data stored in the image data storage section 52.

In more detail, the image analysis section 54 includes a phase acquisition section 58, a surface roughness acquisition section 60, and a spatial information acquisition section 62. The phase acquisition section 58 extracts luminance for each corresponding pixel of the polarization images in a plurality of azimuths, thus deriving the change in luminance relative to the polarization azimuth. If the polarization images are oriented in three azimuths, namely, azimuths $\phi 1$, $\phi 2$, and $\phi 3$, a continuous function as illustrated in FIG. 6 is obtained by approximating a curve passing through three points at the coordinates ($\phi 1$, I1), ($\phi 2$, I2), and ($\phi 3$, I3) for the three azimuths to the function of Formula 1 by using the least squares method or the like. Of these, the azimuth $\phi$ that provides a maximum luminance Imax is the phase angle φ.

It should be noted that the polarization images are not limited to being oriented in three azimuths, and the approximation to a curve may be performed from four or more points by using polarization images oriented in four or more azimuths.

Repetition of this process for each pixel provides a phase angle image having the phase angle φ mapped on the image plane. It should be noted, however, that, in terms of achieving the purpose of acquiring the surface roughness of the target object, it is sufficient if the phase angle φ is acquired only on a silhouette of the target object or a portion of the silhouette of the target object at a position where the specular reflectance changes. As a region of the silhouette of the target object, an edge extraction or contour extraction result obtained by an existing filtering process may be used, or a tracking result from a previous frame, in the case of video, may be used. Also, the specular reflectance is dependent on the relationship in inclination between the imaging surface and the subject surface. Therefore, a position where the specular reflectance changes may be identified by finding a normal vector using polarization images. Techniques for finding a normal vector distribution from polarization images are generally known.

As a result, the change in the phase angle φ relative to the specular reflectance Rs is obtained as illustrated in FIGS. 14 to 16. It is sufficient, however, if the horizontal axis is a parameter that has a one-to-one correspondence with the specular reflectance, and as long as a position on a specific line of the subject's silhouette is proportional to the specular reflectance, the vertical axis may be the position in question. Alternatively, if it is only necessary to find a relative roughness with respect to a standard roughness, it is possible to identify the roughness by comparison by taking the same parameter as that for acquiring the standard roughness in question along the horizontal axis.

Further, according to the above principle, the phase angle φ changes with change in the ratio between the p polarized light and the s polarized light. Therefore, if such a change is acquired, the horizontal axis need not be the specular reflectance or a parameter conforming thereto. Assuming a constant specular reflectance and a variable diffuse reflectance, the diffuse reflectance can be taken along the horizontal axis. The surface roughness acquisition section 60 acquires the surface roughness by comparing the change in the phase angle φ acquired as described above against a given evaluation reference. For example, the surface roughness acquisition section 60 calculates the inclination (first derivative) of the phase angle φ relative to the specular reflectance Rs, thus acquiring the maximum value thereof.

It can be said that, as illustrated in FIG. 14, the milder the change in the phase angle φ, and the smaller the maximum value of the inclination, the greater the surface roughness. Alternatively, a range of the specular reflectance Rs over which the inclination of the phase angle φ is equal to or greater than a threshold may be evaluated. In this case, it can be said that the greater the range, the greater the surface roughness. Alternatively, a second derivative of the phase angle φ relative to the specular reflectance Rs may be calculated. The second derivative represents a curvature in a range where the phase angle φ begins to deviate from 90° or 0°. In this case, it can be said that, because the smaller the maximum value of the second derivative value, the milder the change in the phase angle φ, the surface is significantly rough.

In addition, it is understood by a person skilled in the art that various other options are possible as a reference for evaluating the mildness of the change in the phase angle φ or as an index for representing the mildness. The surface roughness acquisition section 60 may hold, therein, a lookup table associating the actual surface roughness measured in advance with an evaluation result of the phase angle φ and acquire an absolute value of the surface roughness by referring to the table on the basis of the evaluation result acquired from a captured image. Various parameters for representing surface roughness are commercially available, and the surface roughness may be defined by any of such parameters. Alternatively, as described above, only a relative surface roughness may be acquired by comparison with a standard evaluation result.

The spatial information acquisition section 62 detects the state of a subject or recognizes the subject on the basis of acquired information regarding the surface roughness. Alternatively, the spatial information acquisition section 62 separates a subject's silhouette having a specific roughness from others. Alternatively, if the surface roughness is found, the size and position of the light source are found from luminance distributions of the silhouettes illustrated in FIG. 2. Therefore, further image analysis may be performed by using that information. For example, it is possible to find the surface roughness of another subject whose surface roughness was not acquired from a luminance distribution thereof on the basis of the position and size of the light source. It is also possible to find the material of the subject by making an assumption of the position and size of the light source, drawing a virtual model imitating the subject, and comparing the model with a silhouette on a captured image or find a normal vector with high accuracy by applying a suitable reflection model.

It should be noted, however, that, in a case where the purpose is accomplished by acquiring only the surface roughness of a specific subject, the function of the spatial information acquisition section 62 may be omitted. The output data generation section 56 is realized by the CPU 23, the GPU 24, the output section 36, and the like illustrated in FIG. 16 and performs a given information processing task on the basis of information identified by the image analysis section 54, generates data to be output such as display image and sound, and outputs the generated data. As described above, the details of information processing performed here are not specifically limited. For example, if it is possible to identify the subject silhouette on the basis of the surface roughness and recognize the positions of various objects in a real space, this technique can be used for in-vehicle camera and automatic robot control.

Also, it is also possible to, by recognizing the user's hand or controller, convert a motion thereof into a command and perform a corresponding information processing task or generate an image obtained by replacing the user's hand or controller with a virtual object or an image obtained by drawing a virtual object that interacts with the user's hand or controller. Alternatively, if introduced into a plant's manufacturing line, it is also possible to use for detection of roughness caused by surface processing and surface damage. Also, if introduced into a system for regularly monitoring metallic and resin products, it is possible to detect a rough surface caused by oxidation or deterioration over time, thus providing an opportunity for replacement or repair.

Further, if used in a system for monitoring human faces, it is also possible to estimate ages on the basis of skin roughness. In addition, it is also possible to estimate a feeling temperature and a degree of tension by using the fact that the skin roughness reduces due to sweat. As described above, various information processing tasks based on surface roughness are possible, and the output data generation section 56 may perform any one of them. Alternatively, the output data generation section 56 may simply output surface roughness data acquired by the surface roughness acquisition section 60 of the image analysis section 54.

Figure 19:
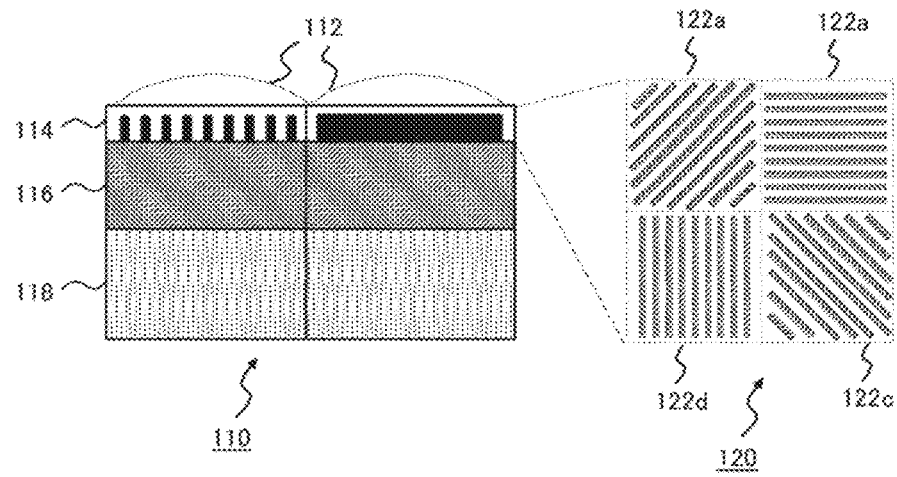
FIG. 19 is a diagram illustrating a structural example of an imaging device having a polarizer layer that can be introduced into an imaging apparatus in the present embodiment.

FIG. 19 illustrates a structural example of an imaging device having a polarizer layer that can be introduced into the imaging apparatus 12 in the present embodiment. It should be noted that FIG. 19 schematically illustrates a functional structure of a cross-section of the device and that detailed structures such as an interlayer insulating film and interconnects are not depicted. An imaging device 110 includes a microlens layer 112, a wire grid type polarizer layer 114, a color filter layer 116, and a photo-detection layer 118. The wire grid type polarizer layer 114 includes polarizers having a plurality of linear conductor members arranged in a striped pattern at intervals smaller than a wavelength of incident light. When light concentrated by the microlens layer 112 enters the wire grid type polarizer layer 114, polarization components whose azimuths are parallel to lines of the polarizer are reflected, thus allowing only polarization components vertical to the lines to pass.

A polarization image is acquired by detecting the polarization components that have passed with the photo-detection layer 118. The photo-detection layer 118 has a semiconductor device structure such as that of a common CCD (Charge Coupled Device) image sensor or a common CMOS (Complementary Metal Oxide Semiconductor) image sensor. The wire grid type polarizer layer 114 includes an arrangement of polarizers that provide different transmission axes from one charge readout unit to another, i.e., from one pixel to another, or in larger units in the photo-detection layer 118. A polarizer arrangement 120, visible as one sees the wire grid type polarizer layer 114 from above, is illustrated on the right in FIG. 19.

The lines shaded in FIG. 19 are conductors (wires) included in the polarizers. It should be noted that each of rectangles with dotted lines represents a polarizer region of a transmission axis in one direction and that the dotted lines themselves are not actually formed. In the example illustrated, polarizers of transmission axes in four directions are arranged in four regions 122a, 122b, 122c, and 122d, in two rows by two columns. In the figure, the polarizers at opposite angles have their transmission axes orthogonal to each other, and the polarizers adjacent to each other have their transmission axes that differ by 45°. That is, polarizers are provided in four directions, 45° apart from each other.

These polarizers serve as a substitute for the linear polarizer plate 70, making it possible to acquire polarization information regarding four azimuths, 45° apart from each other, in regions of the photo-detection layer 118 provided underneath, each corresponding to one of the four regions 122a, 122b, 122c, and 122d. By further arranging a given number of such polarizers vertically and horizontally and connecting peripheral circuitry for controlling charge readout timings, it is possible to realize an image sensor that simultaneously acquires polarization information regarding four azimuths as two-dimensional data.

In the imaging device 110 illustrated in FIG. 19, the color filter layer 116 is provided between the wire grid type polarizer layer 114 and the photo-detection layer 118. The color filter layer 116 includes, for example, an arrangement of respective filters through which red, green, and blue light pass in association with the respective pixels. This provides polarization information by color in accordance with the combination of the direction of the transmission axis of the polarizer in the wire grid type polarizer layer 114 and the filter color in the color filter layer 116 that is located under the wire grid type polarizer layer 114. That is, polarization information in the same azimuth and for the same color is obtained discretely on the image plane. As a result, a polarization image for each azimuth and for each color is obtained by interpolating the polarization information as appropriate.

Also, it is possible to reproduce a non-polarization color image by performing computations on polarization images of the same color. Image acquisition techniques using a wire grid type polarizer are also disclosed, for example, in JP 2012-80065A. It should be noted, however, that polarization luminance images are basically used in the present embodiment. Therefore, if color images are not required in other usages, the color filter layer 116 may be omitted. Also, the polarizers are not limited to a wire grid type, and linear dichroic polarizers or other type of polarizers may also be used.

Figure 20:
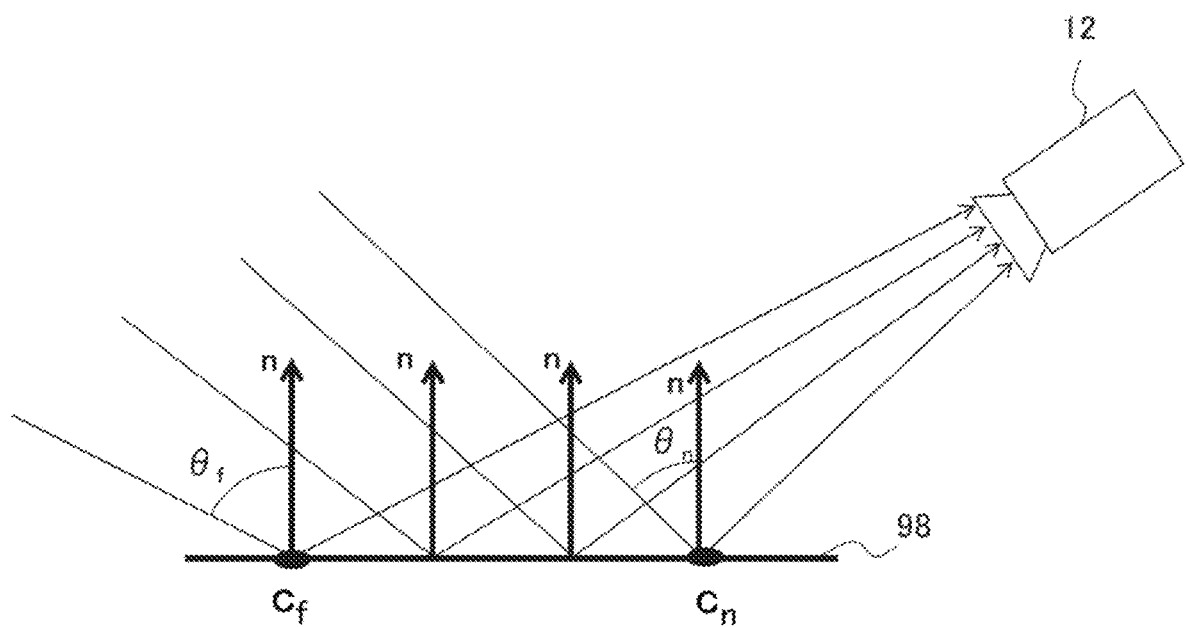
FIG. 20 is a diagram illustrating a relationship between a subject surface position and a specular reflectance in the present embodiment.

FIG. 20 illustrates a relationship between a subject surface position and a specular reflectance. In a case where a planar subject 98 as illustrated is captured with the imaging apparatus 12, an elevation angle to the imaging surface of the imaging apparatus 12 differs depending on a position on the subject 98. That is, in the state illustrated, the farther from the imaging surface, the smaller the elevation angle. Then, as illustrated, an incident angle $\theta_f$ of light observed as specular reflection at a position $c_f$ far from the imaging surface is greater than an incident angle $\theta_n$ of light observed as specular reflection at a position $c_n$ close to the imaging surface. Assuming that a refractive index of the subject 98 is constant, it is known that the larger the incident angle, the larger the reflectance (Fresnel reflection). Therefore, the specular reflectance changes monotonously on the line connecting the position $c_n$ and the position $c_f$. By extension, the change in the phase angle φ relative to the position on the line is equivalent to the change in the phase angle φ relative to the specular reflectance.

FIG. 21 illustrates a relationship between a surface position of a subject having a different shape from that illustrated in FIG. 20 and a specular reflectance. In this example, a subject 100 has a convex curved shape. In a case where this subject is captured with the imaging apparatus 12, the elevation angle from each position of the surface of the subject 100 to the imaging surface changes to a greater extent than in the case of a planar shape illustrated in FIG. 20. That is, the difference between the incident angle $\theta_n$ of light observed as specular reflection to the position $c_n$ close to the imaging surface and the incident angle $\theta_f$ thereof to the position $c_f$ far from the imaging surface is greater than in the case of a planar shape, thus resulting in a larger difference in reflectance in consideration of Fresnel reflection.

FIG. 22 each schematically illustrates a manner in which the phase angle φ is expressed as a function of the position in the capturing environment as illustrated in FIGS. 20 and 21. That is, in a captured image 102 illustrated on the upper side, the change in the phase angle φ from the position $c_n$ to the position $c_f$ in a silhouette 104 of the subject is depicted on the lower side. The subject has a planar or curved surface in shape. In a case where the change in reflectance on the subject surface is mild as in the case illustrated in FIG. 20, the change in the phase angle φ is also mild as illustrated in (a). In a case where the change in reflectance on the subject surface is steep as in the case illustrated in FIG. 21, the horizontal scale is reduced, thus resulting in a steep change in the phase angle φ as illustrated in (b) even if the surface roughness is the same.

Therefore, in the case where the surface roughness is derived, for example, from the inclination of the phase angle $\varphi$ after finding the phase angle $\varphi$ in the same range of the image, it is necessary to consider the difference, if any, in the subject shape. For example, a normal vector distribution is found in the same range from polarization images in a plurality of azimuths followed by adjustment of the horizontal scale on the basis of the normal vector distribution. Alternatively, in a case where the subject's reflectance or the light source position is known in addition to the normal vectors, the specular reflectance can be found by calculation. Therefore, the phase angle $\varphi$ may be represented by strictly taking the specular reflectance along the horizontal axis.

It should be noted, however, that, in a situation where subjects in the same shape are captured from the same direction as done with products carried on belt conveyors of manufacturing lines, no effects are caused by the difference in shape. This makes it possible to readily find the relative surface roughness by taking the position along the horizontal axis. Alternatively, possible effects caused by the shape may be kept to a minimum by acquiring changes of the phase angle $\varphi$ in a minute region as a target, the region, although being a curved surface, being capable of being regarded as a plane with a small change in normal vector. In this case, it is only necessary to find a range with a smaller error (e.g., a length from $c_n$ to $c_f$) by calculating the surface roughness using captured images of subjects in various shapes.

Also, as illustrated in FIG. 7, a high luminance portion of a monochromatic subject's silhouette has a high specular reflectance, and other regions have a high diffuse reflectance. Therefore, it is possible to similarly find the surface roughness by finding the phase angle $\varphi$ in a range of the silhouette of the subject where the difference in luminance is equal to or greater than a given value and representing the phase angle $\varphi$ with the luminance taken along the horizontal axis. The luminance used here may be a luminance at a corresponding position of a common color captured image or a mean value of polarization luminance in a plurality of azimuths. As described above, any parameter can be similarly used in the present embodiment as long as it is correlated with the specular reflectance (or, in some cases, with the ratio between the s polarized light and the p polarized light). Therefore, it is only necessary to adopt a parameter that has lesser burden as occasion demands, the parameter including the capturing environment, a subject characteristic, and accuracy required.

It should be noted that FIGS. 20 and 21 are based on an assumption that the surface roughness at a certain time of day is acquired by sampling the polarization luminance at a plurality of positions of the subject from a captured image at that time of day. Meanwhile, the present embodiment can be realized if the change in the phase angle relative to the change in the specular reflectance can be acquired. Therefore, captured images at different times of day may be used for sampling. For example, a video may be captured while moving the light source or the imaging apparatus 12 in such a manner that the specular reflectance at a certain position of the subject changes chronologically. Change in phase angle similar to that which has been acquired so far can be acquired by sampling the polarization luminance at the same position from a series of image frames acquired as described above. In this case, the target object to be moved is not limited as long as the specular reflectance changes. Also, if the specular reflectance can be changed monotonously, the surface roughness can be acquired also by a similar evaluation from the change in the phase angle relative to time taken along the horizontal axis.

FIG. 23 illustrates the change in the phase angle $\varphi$ relative to the specular reflectance Rs and an example of drawing an object having the corresponding surface roughness. It is assumed that conditions other than the surface roughness such as lighting environment are the same. In the example illustrated in (a) with a low surface roughness ($\sigma$=0.10), some regions of the cylindrical silhouette that is a subject have a high reflectance due to specular reflection. In the example with an intermediate surface roughness ($\sigma$=0.50) illustrated in (b), the silhouette has a lower luminance due to specular reflection than that in (a). In the example with a high surface roughness ($\sigma$=0.80) illustrated in (c), high-luminance regions caused by specular reflection are hardly identifiable.

Although the changes from (a) to (b) and (C) can take place, for example, as a result of widening of a lighting area, it is clear from the analysis of the phase angle $\varphi$ that these changes are attributable to the changes in surface roughness. Also, once the change in the phase angle $\varphi$ relative to the specular reflectance Rs illustrated on the upper side can be created, it is possible to trace back the specular reflectance Rs from the phase angle $\varphi$. This makes it possible to identify the specular reflectance Rs from the phase angle $\varphi$ at an arbitrary position of the silhouette surface of the same subject, and by extension, the ratio between specular reflectance and diffuse reflectance, thus allowing for a virtual object to be drawn with a suitable reflection model or a normal vector to be found with accuracy.

Figure 24:
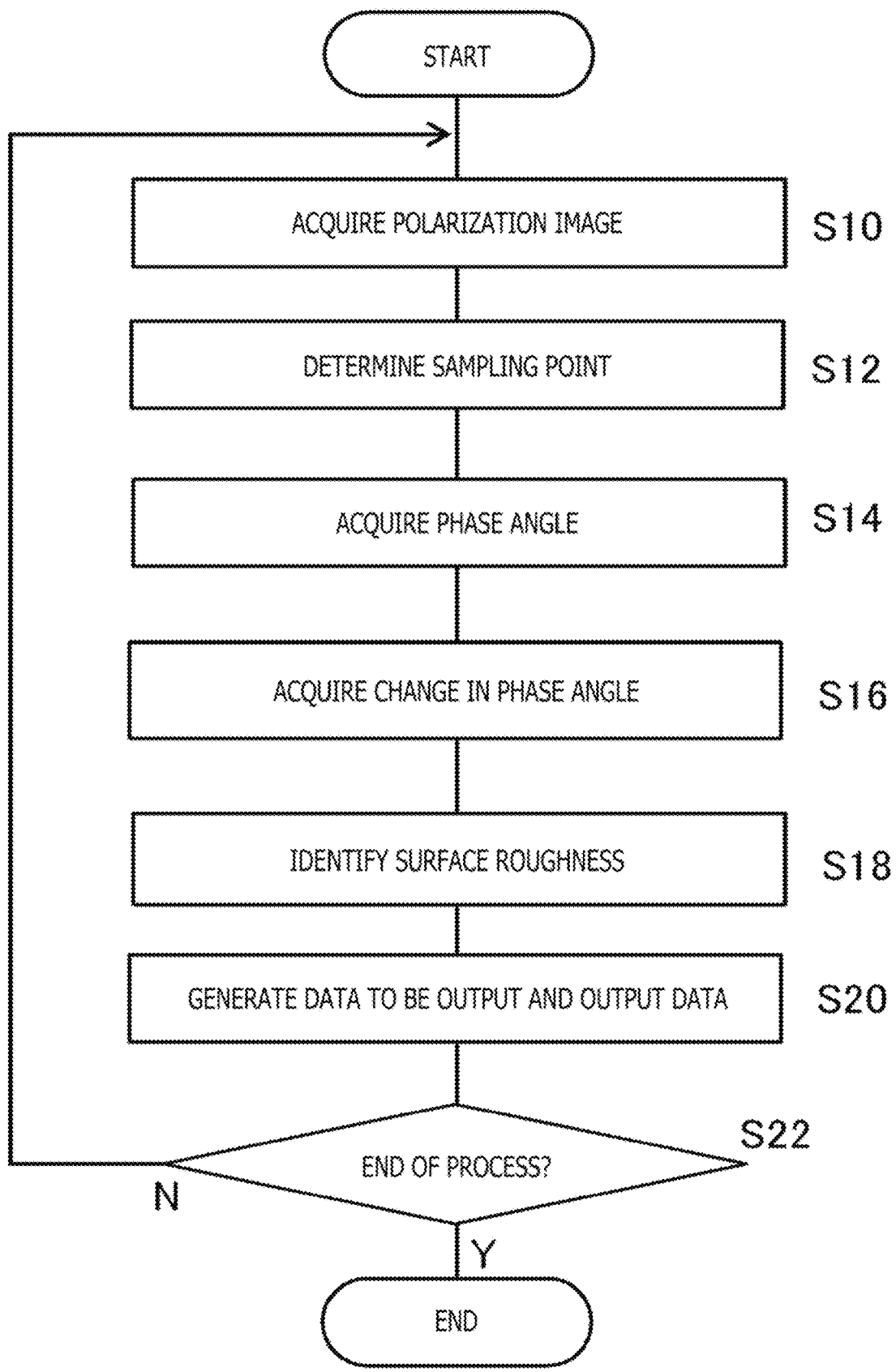
FIG. 24 is a flowchart illustrating a processing procedure for the information processing apparatus to acquire information including the surface roughness of the target object from a captured image and output necessary data in the present embodiment.

A description will be given next of operation of the information processing apparatus 10 realized by the configuration described so far. FIG. 24 is a flowchart illustrating a processing procedure for the information processing apparatus 10 to acquire information including the surface roughness of the target object from a captured image and to output necessary data in the present embodiment. This flowchart is started in a state where the imaging apparatus 12 that has established communication with the information processing apparatus 10 is capturing polarization images of the target object. First, the image acquisition section 50 acquires polarization images in at least three azimuths as captured images from the imaging apparatus 12.

Next, the phase acquisition section 58 of the image analysis section 54 identifies the region of the target object's silhouette in the polarization images and determines sampling points for finding the phase angle $\varphi$ in the region on the basis of a given rule (S12). Although the sampling points are distributed, for example, over the line from the position $c_n$ to the position $c_f$ illustrated in FIG. 22, they may not necessarily be distributed linearly. That is, the sampling points may be located at discrete positions in a certain two-dimensional region as long as these is a plurality of locations having different specular reflectances, and these points are not limited in positional relationship. In order to determine such sampling points, the image analysis section 54 may find a normal vector of the target object or a luminance distribution thereof by using polarization images. Alternatively, the image analysis section 54 may acquire a specular reflectance or diffuse reflectance from measurement values of various sensors independent of the imaging apparatus 12 and determine sampling points on the basis of a distribution thereof.

Next, the phase acquisition section 58 extracts the luminance of the pixels at the sampling points in the polarization images in the plurality of azimuths and derives the changes in luminance relative to the polarization azimuths, thus acquiring, as the phase angle $\varphi$, the azimuth that provides the maximum luminance (S14). Performing this process for all the positions determined in S12 provides the phase angles φ for the plurality of specular reflectances. Next, the surface roughness acquisition section 60 acquires the change in the phase angle φ relative to the specular reflectance or a parameter having a correlation therewith taken along the horizontal axis (S16). In a case where the target is an object having an arbitrary shape and where the change in the phase angle φ is represented relative to the position on the image taken along the horizontal axis, the position parameter is normalized on the basis of a normal vector distribution or the like as described above.

This process is equivalent to conversion of each position into a specular reflectance and taking the reflectance in question along the horizontal axis. It is a matter of course that, in a case where a specular reflectance is acquired separately, the specular reflectance need only be taken along the horizontal axis. Next, the surface roughness acquisition section 60 identifies the surface roughness of the target object by comparing the change in the phase angle φ against a given reference (S18). Specifically, as described above, the first and second derivatives of the change in the phase angle φ, and the specular reflectance range over which the phase angle φ changes from 90° to 0°, and the like can be used. Qualitatively, in a case where it can be said that the change in the phase angle φ is mild from such reference, the surface roughness is high in magnitude, and in a case where it can be said that the change in the phase angle φ is steep, the surface roughness is low in magnitude.

The surface roughness acquisition section 60 may hold, in an internal memory, a lookup table associating a parameter representing how mildly or steeply the change occurs with an absolute value of the surface roughness and acquire the absolute value of the surface roughness on the basis of the acquired parameter. Alternatively, the surface roughness acquisition section 60 may store a parameter representing how mildly or steeply the change occurs, the parameter corresponding to a reference surface roughness, and may only identify whether or not the surface roughness is higher than the reference surface roughness on the basis of the relationship in magnitude between the acquired parameter and the reference value. The spatial information acquisition section 62 of the image analysis section 54 and the output data generation section 56 identify a region of a silhouette from an image plane by using the identified surface roughness, acquire the light source position and area, and other states of the target object for image processing as appropriate, generate data to be output, and output the generated data (S20).

As described above, surface roughness data itself may be used as data to be output. A video is captured as a captured image, and during a time period where there is no need to stop the processes due, for example, to user operation (N in S22), the processes from S10 to S20 are repeated on subsequent image frames. It should be noted, however, that, once the surface roughness is identified, the subsequent processes are omitted as appropriate, for example, in a case where the purpose is accomplished by tracking the silhouette contour identified. Alternatively, the surface roughness may be checked regularly at a frame rate lower than a display frame rate. This makes it possible to correct any erroneous tracking process. If it becomes necessary to stop the processes due, for example, to user operation, all processes are terminated (Y in S22).

In the embodiment described above, the surface roughness of a subject is acquired by using polarization images. Specifically, the polarization azimuth that provides the maximum polarization luminance is acquired as a phase angle, thus finding change relative to the specular reflectance or a parameter having a correlation therewith. Then, how mildly or steeply the change in phase angle occurs is evaluated on the basis of a given reference, thus identifying the surface roughness as a relative or absolute value. This makes it possible to extract a target object's silhouette having a specific roughness with accuracy regardless of the light condition, thus allowing for detection and recognition of the target object's state, separation of a silhouette, and information processing using them with stable accuracy.

Also, if the surface roughness is found, it is possible to identify the state of the light source from a silhouette's luminance distribution or the like. This makes it possible to realize highly accurate image representation by performing suitable shading on a virtual object drawn in the captured image. Also, specular reflectance or the ratio between specular reflectance and diffuse reflectance can be found from the phase angle φ by tracing back information regarding the change in the phase angle φ that is used to obtain the surface roughness. By taking advantage of this feature, it is possible to draw a virtual object imitating a real object correctly or find a normal vector distribution of a target object with higher accuracy.

The present invention has been described above on the basis of an embodiment. The above embodiment is illustrative, and it is understood by a person skilled in the art that the combination of constituent elements and processes thereof can be modified in various ways and that such modification examples also fall within the scope of the present invention.

REFERENCE SIGNS LIST

10 Information processing apparatus, 12 Imaging apparatus, 16 Display apparatus, 23 CPU, 24 GPU, 26 Main memory, 50 Image acquisition section, 52 Image data storage section, 54 Image analysis section, 56 Output data generation section, 58 Phase acquisition section, 60 Surface roughness acquisition section, 62 Spatial information acquisition section.

INDUSTRIAL APPLICABILITY

As described above, the present invention is applicable to various types of information processing apparatuses such as a gaming apparatus, a mobile terminal, a monitoring camera system, a vehicle-mounted camera system, and an inspection apparatus.

The invention claimed is:
1. An information processing apparatus comprising:
an image acquisition section adapted to acquire data of polarization images in a plurality of azimuths;
a phase angle acquisition section adapted to not only derive change in polarization luminance representing a subject's silhouette relative to the azimuth by using the polarization images but also acquire the azimuth that provides a maximum value of the polarization luminance as a phase angle;
a surface roughness acquisition section adapted to acquire a surface roughness of the subject by holding in a storage a lookup table associating a parameter with one or more of a relative value of surface roughness and an absolute value of surface roughness, acquiring the parameter from the memory, and determining the surface roughness on the basis of the acquired parameter, the parameter representing a characteristic of the phase angle with respect to change in the specular reflectance in accordance with a given reference; and an output data generation section adapted to generate data according to the surface roughness and output the generated data.

2. The information processing apparatus of claim 1, wherein the surface roughness acquisition section evaluates, as a characteristic of the phase angle, a parameter representing how mildly or steeply change in the phase angle occurs relative to the change in the specular reflectance.

3. The information processing apparatus of claim 1, wherein
the phase angle acquisition section acquires the phase angles at a plurality of positions having different specular reflectances in the subject's silhouette, and
the surface roughness acquisition section evaluates the characteristic by acquiring the specular reflectances at the plurality of positions and then representing the change in the phase angle relative to the specular reflectance.

4. The information processing apparatus of claim 1, wherein
the phase angle acquisition section acquires the phase angles in a range of the subject's silhouette where the specular reflectance varies monotonously, and
the surface roughness acquisition section evaluates the characteristic of the phase angle by representing the change in the phase angle relative to a position in the range.

5. The information processing apparatus of claim 4, wherein the surface roughness acquisition section evaluates the characteristic after adjusting the change in the phase angle relative to the position on a basis of a normal vector distribution on a surface of the subject.

6. The information processing apparatus of claim 1, wherein
the phase angle acquisition section acquires the phase angle in a range of the subject's silhouette where a difference in luminance is equal to or greater than a given value, and
the surface roughness acquisition section evaluates the characteristic of the phase angle by representing the change in the phase angle relative to the luminance.

7. The information processing apparatus of claim 1, wherein
the image acquisition section acquires video data of the polarization images in which a state in which the specular reflectance of the subject changes is captured,
the phase angle acquisition section acquires, from a plurality of image frames of the video, the phase angles at positions of the subject's silhouette where the specular reflectance changes monotonously, and
the surface roughness acquisition section evaluates the characteristic of the phase angle by representing the change in the phase angle relative to time.

8. The information processing apparatus of claim 1, wherein the surface roughness acquisition section refers to a lookup table associating a parameter representing the characteristic of the phase angle with the surface roughness and acquires the surface roughness of the subject on a basis of a value of the parameter acquired on a basis of the polarization images.

9. The information processing apparatus of claim 1, wherein the surface roughness acquisition section acquires the relative surface roughness with respect to a reference by comparing a reference value of the parameter representing the characteristic of the phase angle and a value of the parameter acquired on a basis of the polarization images.

10. The information processing apparatus of claim 1, further comprising: a spatial information acquisition section adapted to acquire information regarding a state of a light source on a basis of the surface roughness of the subject and a luminance distribution of the subject's silhouette.

11. The information processing apparatus of claim 1, further comprising:
a spatial information acquisition section adapted to acquire, by using information regarding the change in the phase angle relative to the change in the specular reflectance and on a basis of the phase angle at a position of the subject's silhouette, the specular reflectance at the position.

12. A surface roughness acquisition method by an information processing apparatus, comprising:
acquiring data of polarization images in a plurality of azimuths;
not only deriving change in polarization luminance representing a subject's silhouette relative to the azimuth by using the polarization images but also acquiring the azimuth that provides a maximum value of the polarization luminance as a phase angle;
acquiring a surface roughness of the subject by holding in a storage a lookup table associating a parameter with one or more of a relative value of surface roughness and an absolute value of surface roughness, acquiring the parameter from the memory, and determining the surface roughness on the basis of the acquired parameter, the parameter representing a characteristic of the phase angle with respect to change in the specular reflectance in accordance with a given reference; and
generating data according to the surface roughness and outputting the generated data.

13. A non-transitory, computer readable storage medium containing a computer program, which when executed by a computer, causes the computer to carry out actions, comprising:
acquiring data of polarization images in a plurality of azimuths;
not only deriving change in polarization luminance representing a subject's silhouette relative to the azimuth by using the polarization images but also acquiring the azimuth that provides a maximum value of the polarization luminance as a phase angle;
acquiring a surface roughness of the subject by holding in a storage a lookup table associating a parameter with one or more of a relative value of surface roughness and an absolute value of surface roughness, acquiring the parameter from the memory, and determining the surface roughness on the basis of the acquired parameter, the parameter representing a characteristic of the phase angle with respect to change in the specular reflectance in accordance with a given reference; and
generating data according to the surface roughness and outputting the generated data.

* * * * *